United States Patent
Nakamura

(10) Patent No.: US 6,294,119 B1
(45) Date of Patent: Sep. 25, 2001

(54) PRODUCTION OF UNVULCANIZED TREAD RUBBER FOR PNEUMATIC TIRES

(75) Inventor: Yoshinori Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/220,757

(22) Filed: Dec. 28, 1998

(30) Foreign Application Priority Data

Dec. 26, 1997 (JP) .................................................. 9-359423
Mar. 18, 1998 (JP) ................................................ 10-068411
Aug. 5, 1998 (JP) ................................................ 10-221897

(51) Int. Cl.$^7$ .......................... B29C 47/06; B29C 47/14; B29C 47/30; B60C 1/00; B60C 19/08

(52) U.S. Cl. .................................. 264/173.12; 152/152.1; 152/209.5; 152/DIG. 2; 156/110.1; 264/173.17; 264/174.11; 425/131.1; 425/133.5; 425/462

(58) Field of Search ............................. 152/152.1, 209.5, 152/DIG. 2; 156/110.1; 264/173.12, 173.17, 174.11; 425/131.1, 133.5, 462, 466, 467

(56) References Cited

U.S. PATENT DOCUMENTS

| | | | |
|---|---|---|---|
| 2,339,546 | * | 1/1944 | Hanson . |
| 3,099,859 | * | 8/1963 | Eilersen . |
| 3,486,195 | * | 12/1969 | Greenwood . |
| 3,584,343 | * | 6/1971 | Kohlepp et al. . |
| 4,316,710 | * | 2/1982 | Greenwood . |
| 4,548,568 | * | 10/1985 | Herbert et al. . |
| 4,556,376 | * | 12/1985 | Sievers et al. . |
| 4,556,382 | * | 12/1985 | Nadeau et al. . |
| 4,653,994 | * | 3/1987 | Capelle . |
| 4,790,975 | | 12/1988 | Järvenkylä et al. . |
| 5,937,926 | * | 8/1999 | Powell . |
| 5,942,069 | * | 8/1999 | Gerresheim et al. . |
| 6,044,882 | * | 4/2000 | Crawford et al. . |

FOREIGN PATENT DOCUMENTS

| | | |
|---|---|---|
| 91 07 812.1 | 12/1991 | (DE) . |
| 658452 * | 6/1995 | (EP) . |
| 0 792 733 A1 | 9/1997 | (EP) . |
| 0 868 991 A1 | 10/1998 | (EP) . |
| 0 878 330 A2 | 11/1998 | (EP) . |
| 0 881 060 A2 | 12/1998 | (EP) . |
| 8-34204 | 2/1996 | (JP) . |

OTHER PUBLICATIONS

Blow, Rubber Technology and Manufacture, pp. 345–356, 1971.*

* cited by examiner

Primary Examiner—Steven D. Maki
(74) Attorney, Agent, or Firm—Sughrue, Mion, Zinn, Macpeak & Seas, PLLC

(57) ABSTRACT

A pneumatic tire includes a low conductive rubber portion forming at least a cap rubber portion of the tread rubber which provides a tread surface of the tire. A narrow high conductive rubber strip extends in a radial direction of the tire at a widthwise center region of the cap rubber portion, and is exposed to the tread surface to form a discharge path for allowing electrostatic charges of a vehicle body to be discharged to a road surface. An unvulcanized tread rubber for the tire is obtained by passing a high conductive unvulcanized rubber through a passage extending from an extruder unit to the back side of an extrusion orifice, to form at least part of the remaining potion of the tread rubber. The high conductive unvulcanized rubber while passing through the passage is partly introduced into a narrow branch passage and passed through a slit-like opening having a cross-sectional shape which is substantially straight in a height direction of the extrusion head and situated in the vicinity of the back side of the extrusion orifice, to form the narrow strip of the high conductive rubber in a composite body of different kinds of unvulcanized rubbers.

15 Claims, 21 Drawing Sheets

FIG_1

FIG_2

FIG_4

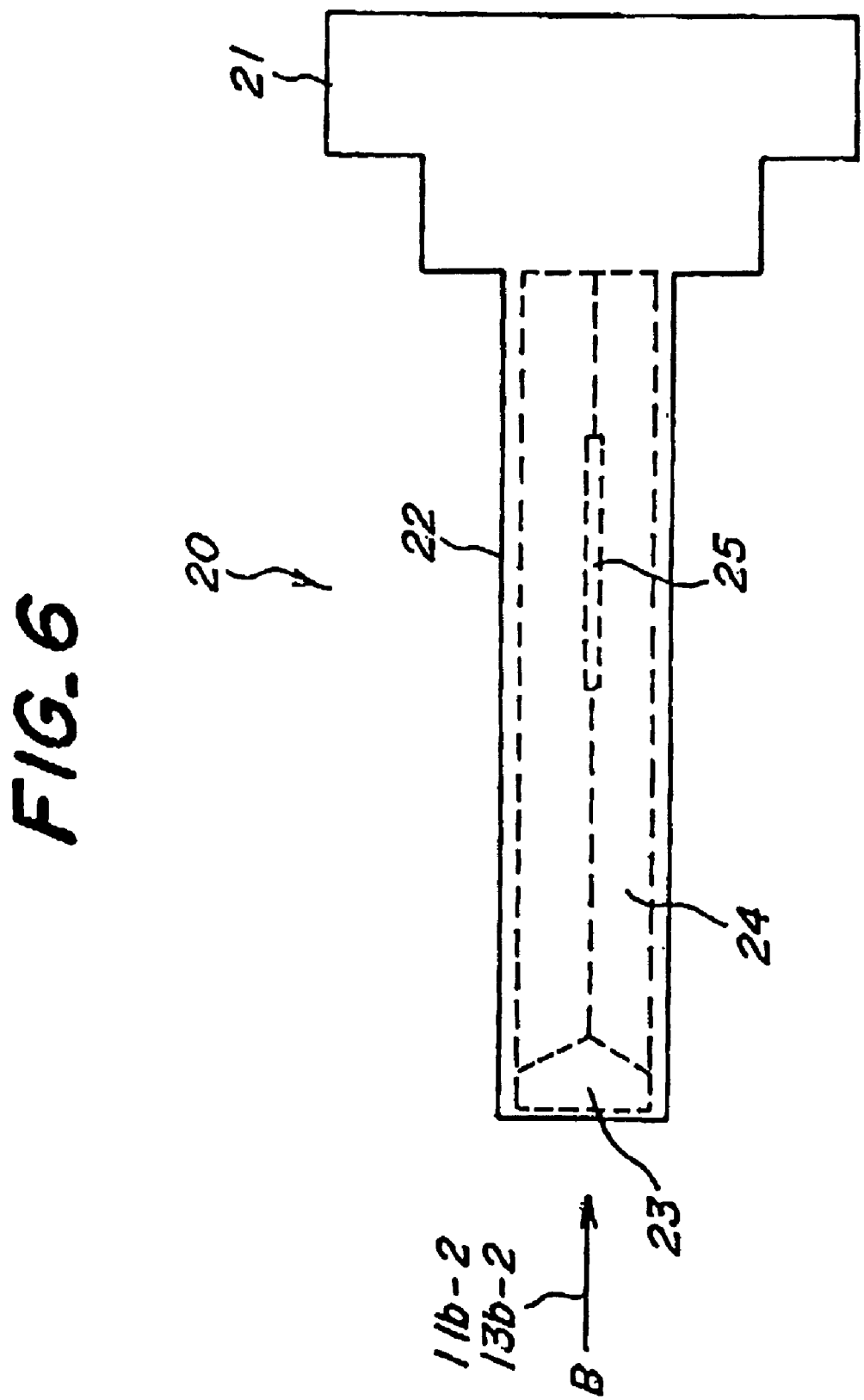

FIG_7
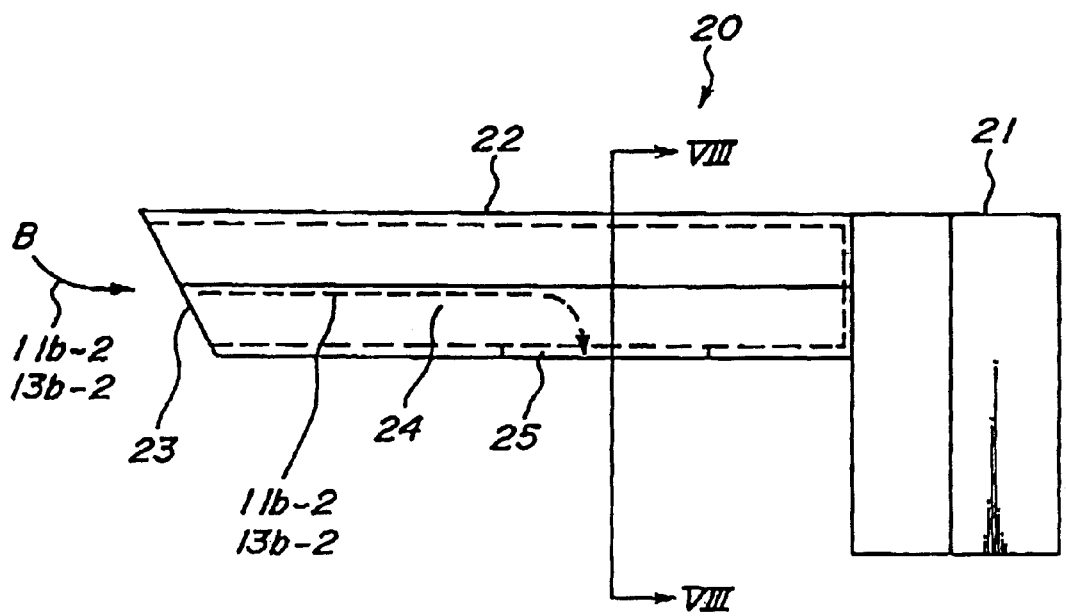
FIG_8
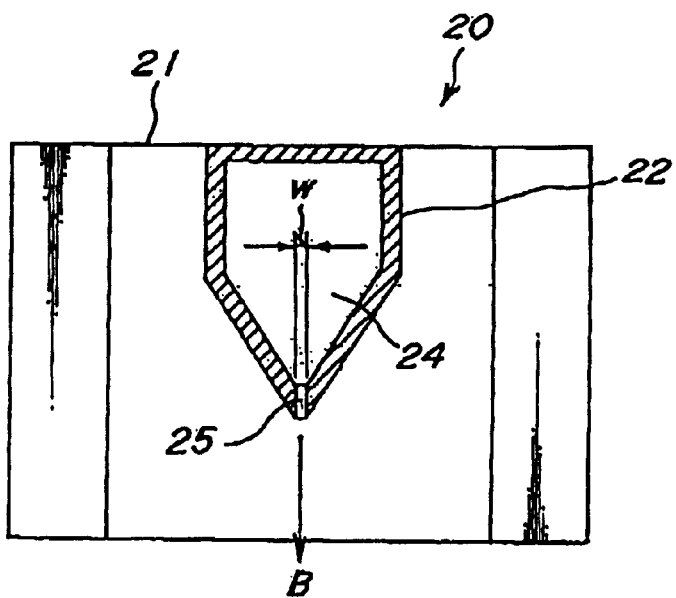

FIG_9
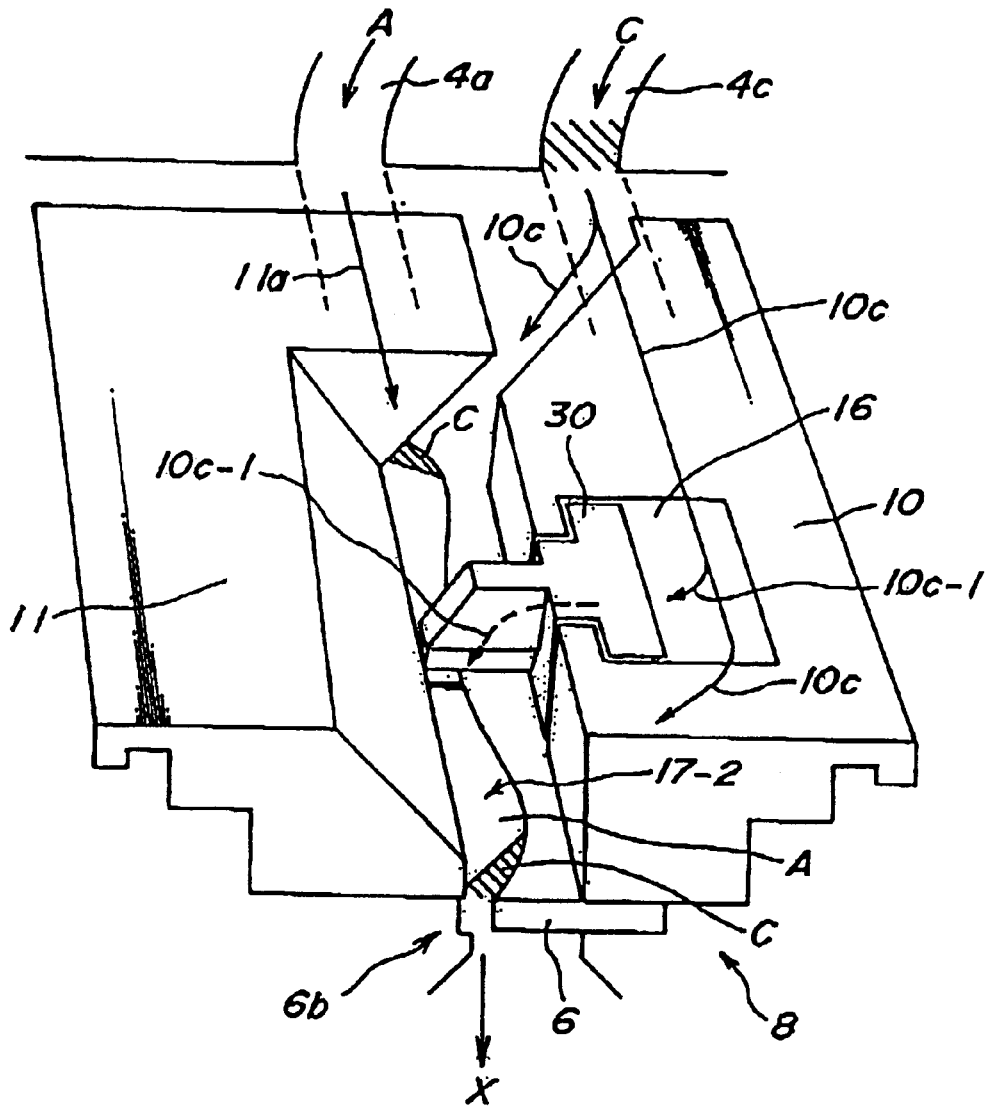

FIG_10
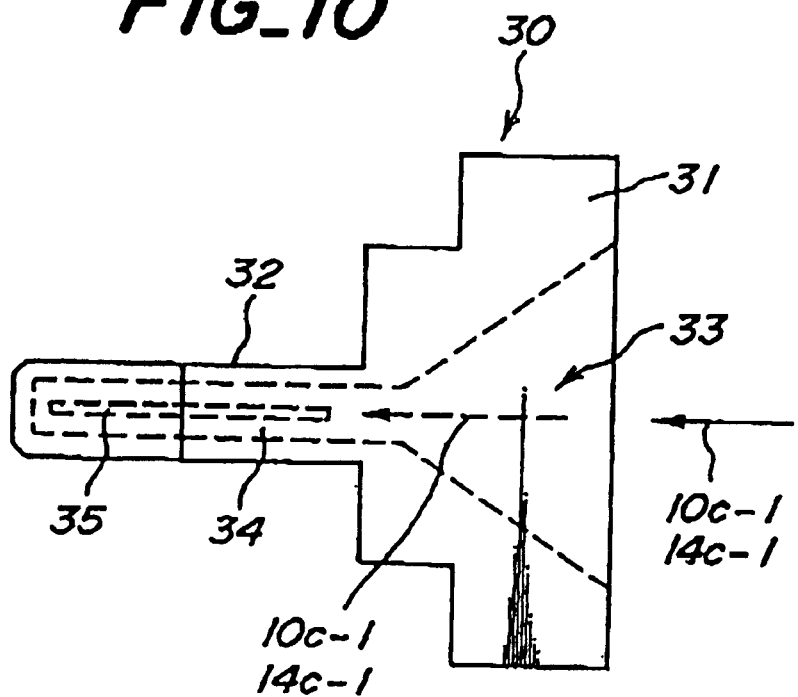
FIG_11
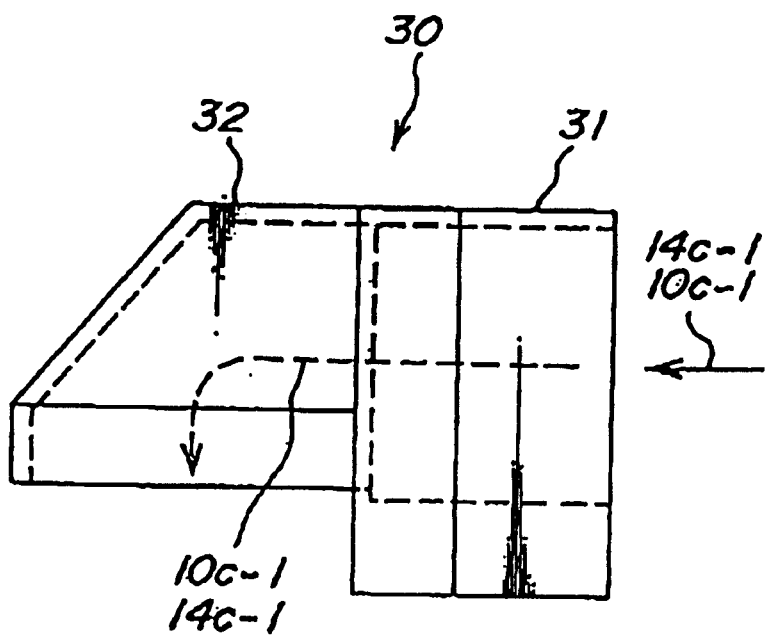

FIG._12
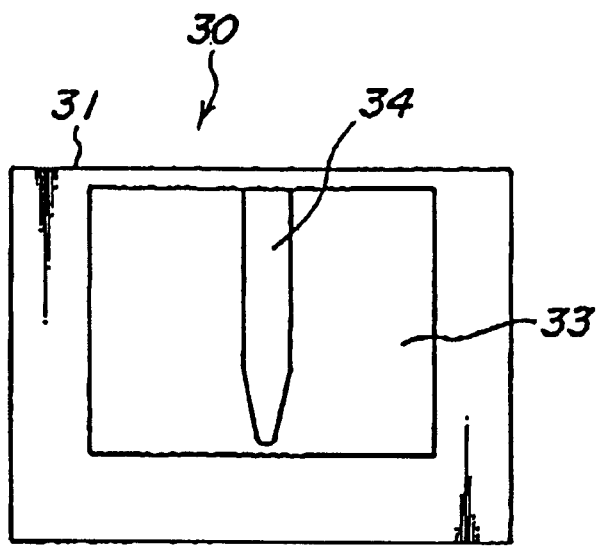
FIG._13
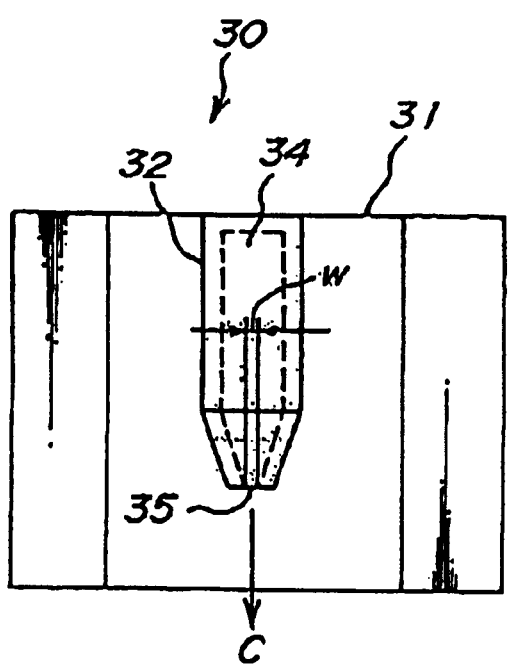

FIG_16

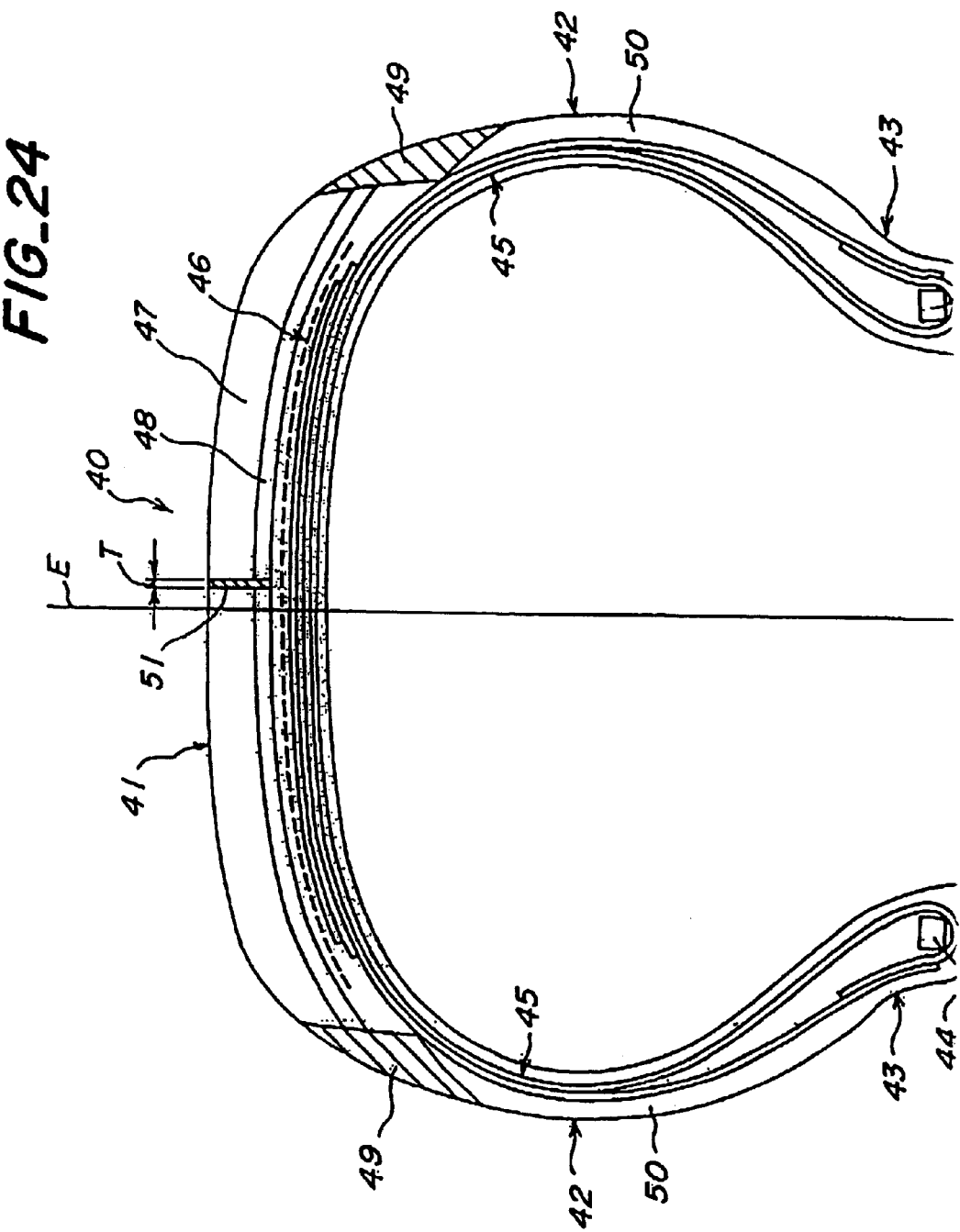
FIG._24

PRODUCTION OF UNVULCANIZED TREAD RUBBER FOR PNEUMATIC TIRES

BACKGROUND OF THE INVENTION

1. Field of the Invention

The present invention relates to a pneumatic tire which includes a tread rubber capable of discharging electrostatic charges of the vehicle body to the road surface. It also relates to method and apparatus for producing unvulcanized tread rubbers for such tires.

2. Description of the Related Art

As known widely, electrostatic charges generated in the vehicle body of passenger cars, trucks or busses cause not only electroshock, but also occasional failure of the vehicle functions due to spark discharge. Such problems do not arise when the tires are comprised of a rubber which contains a large amount of carbon black because the tire has a sufficiently is high conductivity, and the electrostatic charges generated in the vehicle body can be discharged to the road surface through the tire.

There is an increasing demand for tires capable of minimizing fuel consumption of vehicles not only in view of economics, but also from environmental considerations. In order to cope with such demand, it would be desirable to employ low rolling resistance tires in which a large part of carbon black in the tire rubber is replaced with silica. However, by decreasing the amount of carbon black and increasing the amount of silica, it is inevitable that the electric resistance value of the tread rubber increases, making it difficult to discharge electrostatic charges of the vehicle body to the road surface.

In order to discharge electrostatic charges of the vehicle body to the road surface, a discharge means typically in the form of a metal strip may be directly connected to the conductive material of the vehicle body. However, such metal strip rubs or collides with the road surface and has to be exchanged whenever it is worn or broken; otherwise, the above-mentioned problems arising from the electrostatic charges of the vehicle body would be inevitable.

In order to overcome the above-mentioned disadvantages, there has been proposed, for example in JP-08-34204 A, a tire having an extruded tread rubber, in which a tread rubber comprises a conventional high conductive rubber containing carbon black, which is arranged on the center region, and a low conductive rubber containing silica, which is arranged at the remaining regions. According to this proposal, the high conductive rubber region in the tread rubber is connected to an ordinary base rubber containing carbon black, to ensure that the tire exhibits the desired electrostatic discharge function.

However, rubber-reinforcing effect achieved by silica is lower than that by carbon black, and there is a tendency that the tread rubber undergoes non-uniform wear as running of the tire proceeds. More specifically, the silica-blended low conductive rubbers on both sides of the center region exhibit a large amount of wear as compared to the center region comprised of high conductive rubber which contains carbon black. As a result, there tends to be caused a level difference, between the high conductive rubber portion and the low conductive rubber portions on both sides thereof. Such a level difference becomes significant as running proceeds and spreads in the width direction of the tread, causing a marked irregular wear and thereby reducing the service life of the tire.

Furthermore, it has been confirmed that the tread rubber tends to be twisted due to the slip angle which is applied to the tread rubber during cornering of the vehicle, and the high conductive rubber in the center region of the tread projects outwards and apply a large tearing force to the junction between the high conductive rubber and the silica-blended rubber adjacent to the high conductive rubber. Such tearing force tends to cause cracks in the silica-blended rubber which does not provide a sufficient rubber-reinforcing effect. Furthermore, the high conductive rubber occupies a large volume in the tread rubber which results in a degraded rolling resistance property. This shows that the pneumatic tires of this kind requires further improvement.

SUMMARY OF THE INVENTION

It is therefore one object of the present invention to provide an improved pneumatic tire having a low rolling resistance and capable of effectively discharging electrostatic charges of the vehicle body without problems of irregular wear or cracks of the tread rubber.

Another object of the present invention is to provide method and apparatus for producing unvulcanized tread rubbers in economically advantageous manner. The method and apparatus according to the present invention can be applied to the production of both conventional pneumatic tires and pneumatic tires having low rolling resistance property and high conductivity, and requires only slight remodeling of a conventional apparatus for producing unvulcanized tread rubbers in the form of a dual-type extruder in which two extruder units are connected to a common extrusion die head, or a triple-type extruder in which three extruder units are connected to a common extrusion die head.

According to one aspect of the present invention, there is provided a method for producing an unvulcanized tread rubber for pneumatic tires, wherein at least one kind of low conductive unvulcanized rubber and at least one kind of high conductive unvulcanized rubber are supplied to respective extend units on upstream side of a common extrusion head, and thereby caused to flow along respective passages in the extrusion head and then merged with each other at a back side of an extrusion orifice in the extrusion head, before they are continuously extrude from the extrusion orifice as an integrated composite body corresponding to the unvulcanized tread rubber.

In the method according to the present invention, the low conductive unvulcanized rubber is passed through a first passage extending from first extruder unit to the back side of the extrusion orifice, so as to form at least a cap rubber portion of a tread rubber in a product tire; the high conductive unvulcanized rubber is passed through a second passage extending from a second extruder unit to the back side of the extrusion orifice, so as to form at least part of the remaining portion of the tread rubber, and the high conductive unvulcanized rubber while passing through the second passage is partly introduced into a narrow third passage branched from the second passage, and passed through a slit-like opening having a cross-sectional shape which is substantially straight in a height direction of the extrusion head and situated in the vicinity of the back side of the extrusion orifice, so as to form a narrow strip of the high conductive rubber in said composite body of unvulcanized rubbers, said narrow strip extending in the low conductive rubber portion of the tread substantially over the entire thickness and circumference thereof.

According to another aspect of the present invention, there is provided an apparatus for producing an unvulcanized tread rubber for pneumatic tires, wherein at least one kind of low conductive unvulcanized rubber and at least one kind of high conductive unvulcanized rubber are supplied to respective extruder units on upstream side of a common extrusion head, and thereby caused to flow along respective passages in the extrusion head and then merged with each other at a back side of an extrusion orifice in the extrusion head, before they are continuously extruded from the extrusion orifice as an integrated composite body corresponding to the unvulcanized tread rubber.

The apparatus according to the present invention comprises: a first passage extending from a first extrusion unit to the back side of the extrusion orifice, for allowing the low conductive unvulcanized rubber to be passed therethrough so as form at least a cap rubber portion of a tread rubber in a product tire; a second passage extending from a second extrusion unit to the back side of the extrusion orifice, for allowing the high conductive unvulcanized rubber to be passed therethrough so as to form at least part of the remaining portion of the tread rubber, and a narrow third passage branched from the second passage so that the high conductive unvulcanized rubber while passing through the second passage is partly admitted into the third passage and passed through a slit-like opening having a cross-section which is substantially straight in a height direction of the extrusion head and situated in the vicinity of a back side of the extrusion orifice, so as to form a narrow strip of the high conductive rubber in said composite body of unvulcanized rubbers, said narrow strip extending in the low conductive rubber portion of the tread substantially over the entire thickness and circumference thereof.

According to still another aspect of the present invention, there is provided a pneumatic tire comprising a radial carcass layer formed of at least one ply of radially arranged rubber-coated cords and extending between a pair of bead cores which are embedded in bead portions, and at least two belt layers formed of rubber coated cords and arranged on an outer side of the carcass layer, said tire comprising a tread rubber including a cap rubber portion situated in a radially outer region thereof to provide a tread surface of the tire, and sidewall rubbers on both sides of the tread rubber, wherein: said tread rubber has a low conductive rubber portion forming at least said cap rubber portion, and a narrow high conductive rubber strip extending in a radial direction of the tire at a widthwise center region of said cap rubber portion, said rubber strip being exposed to said tread surface of the tire and forming a discharge path for allowing electrostatic charges stored a vehicle body to be discharged to a road surface.

In the tire according to the present invention, the tread rubber is advantageously obtained by vulcanization of a green tire which includes an unvulcanized tread rubber produced by the above-mentioned method so that the narrow strip of the high conductive rubber has a width within a range from 0.05 to 3.5 mm as seen in the width direction of the tire.

BRIEF DESCRIPTION OF THE DRAWINGS

The present invention will be described in further details hereinafter, by referring to certain preferred embodiments shown in the accompanying drawings, in which:

FIG. 6 is a plan view showing one example of a sub-insert block in the extrusion die head;

FIG. 7 is a side view of the sub-insert block shown in FIG. 6;

FIG. 8 is a sectional view of the sub-insert block taken along the line VIII—VIII in FIG. 7;

FIG. 9 is a perspective view, as seen obliquely from the upper rear side, of the extrusion die head shown in FIG. 4;

FIG. 10 is a plan view showing another example of the sub-insert block in the extrusion die head;

FIG. 11 is a side view of the sub-insert block shown in FIG. 10;

FIG. 12 is a back view of the sub-insert block shown in FIG. 10;

FIG. 13 is a front view of the sub-insert block shown in FIG. 10;

FIG. 15 is a perspective view, as seen obliquely from upper rear side, of the extrusion die head of. FIG. 14, showing one example of the insert block;

FIG. 24 is a sectional view of a pneumatic tire with a tread rubber corresponding to the unvulcanized tread rubber shown in FIG. 20.

DESCRIPTION OF THE PREFERRED EMBODIMENTS

The present invention provides an improved pneumatic tire wherein a low conductive rubber forms at least a cap portion of the tread rubber which provides a tread surface of the tire, and a narrow strip of high conductive rubber extends in a radial direction of the tire at a widthwise center region of the cap portion. The high conductive rubber strip is exposed to the tread surface to form a discharge path for allowing electrostatic charges of a vehicle body to be discharged to a road surface. An unvulcanized tread rubber for the tire according to the invention is obtained by an extrusion process to be described below with reference to the preferred embodiments shown in FIGS. 1 and 2.

Figure 1:
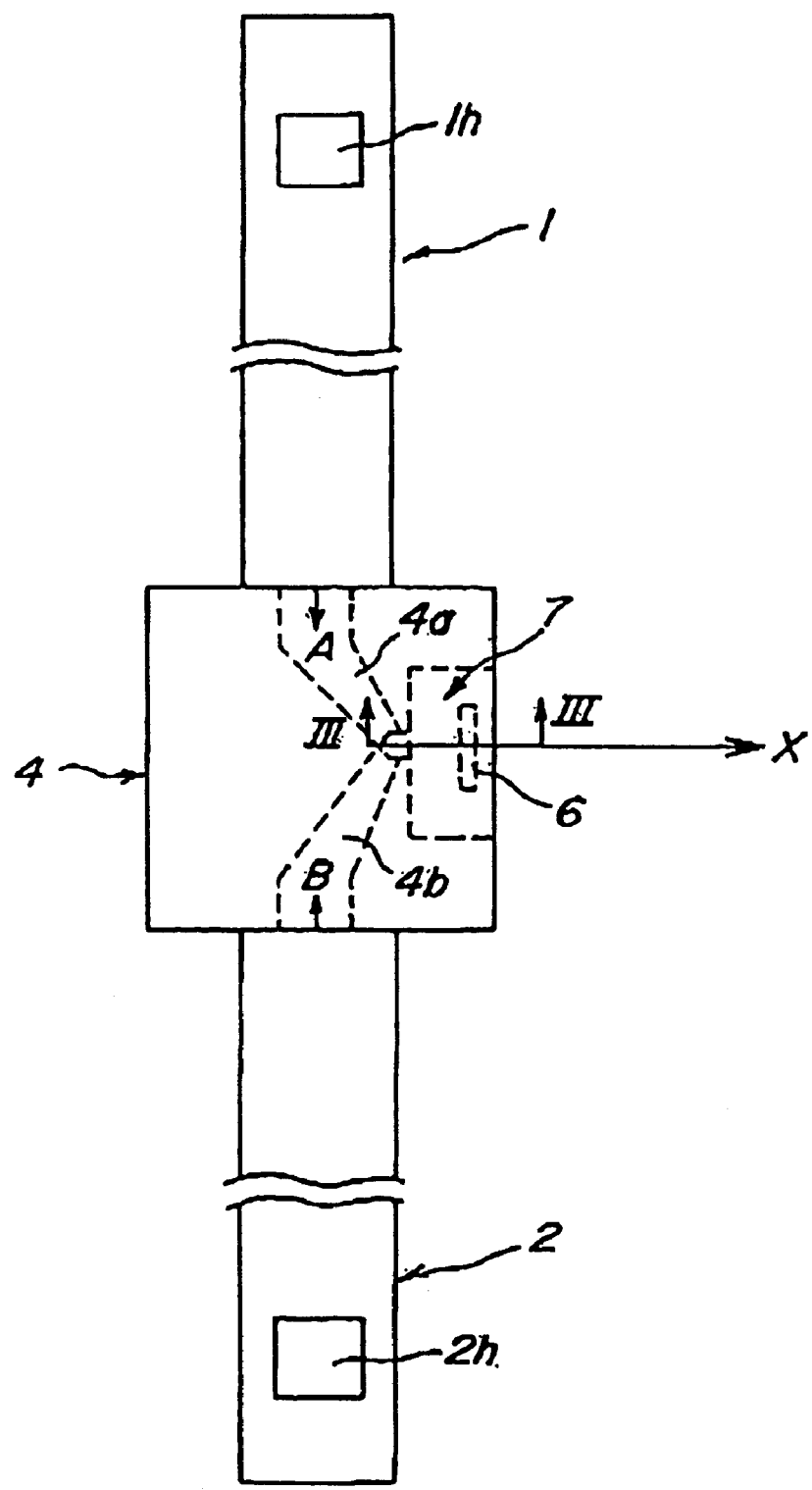
FIG. 1 is a schematic plan view showing a dual-type extruder which may be applied to carry out the present invention.
Figure 2:
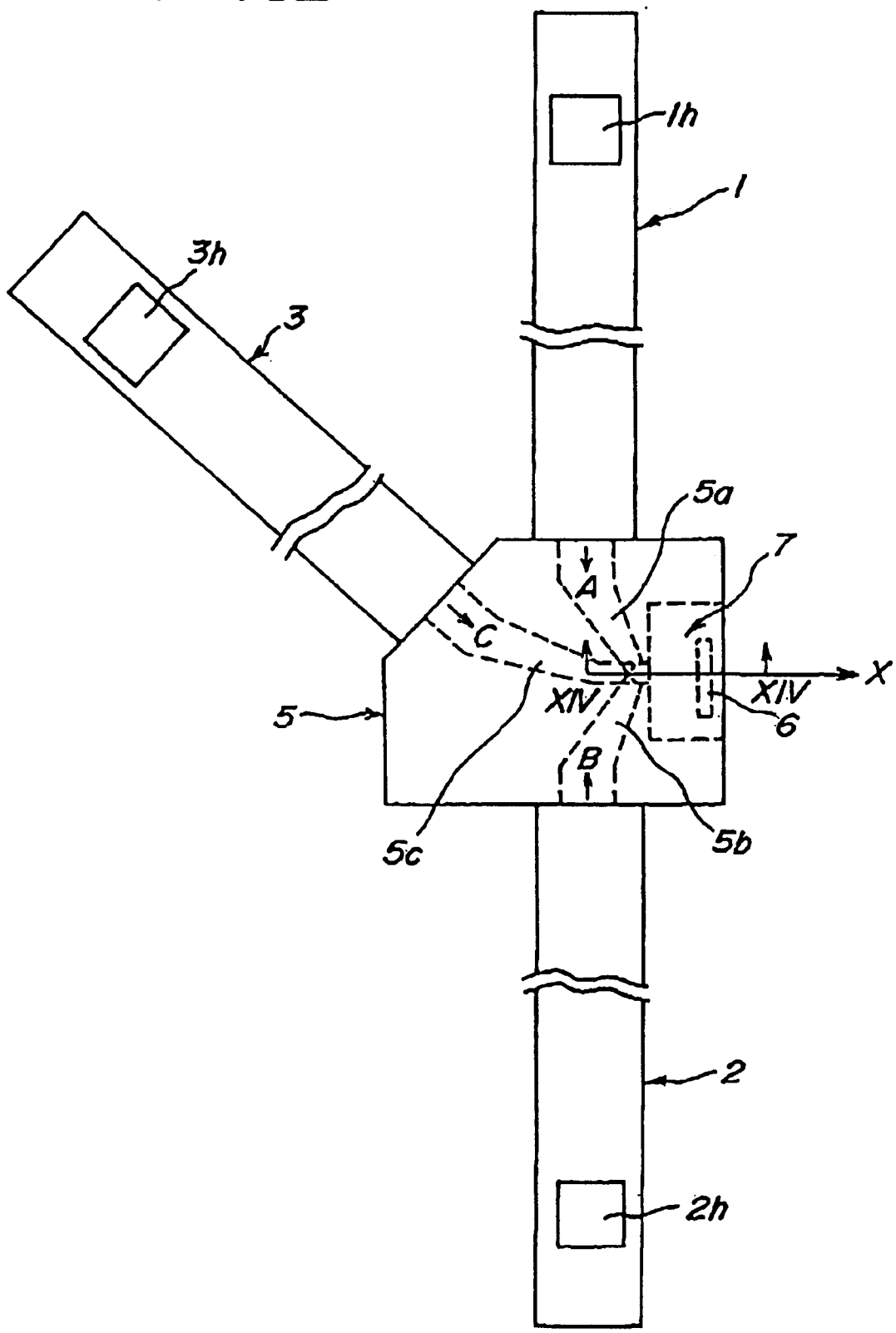
FIG. 2 is a schematic plan view showing a triple-type extruder which may be alternatively applied to carry out the present invention.

A dual-type extruder which way be used in the present invention is shown in FIG. 1, and includes two extruder units 1 and 2 which are connected to an extrusion die head 4. As known in the art, two kinds of unvulcanized rubbers A and B, which are different from each other in terms of blending compositions, are supplied to the extruder units 1 and 2 from respective hoppers 1h and 2h and then kneaded by screws (not shown) which are driven for rotation in the extruder units 1 and 2. As a result, the unvulcanized rubbers A and B exhibiting an enhanced fluidity due to self-exothermicity and increased plasticity are caused to flow toward the extrusion die head 4. It is assumed that the unvulcanized rubber A is a low conductive rubber containing silica as a rubber reinforcing agent, and the unvulcanized rubber B is a high conductive rubber containing a large amount of carbon black which is conventionally used as a rubber reinforcing agent A triple-type extruder is shown in FIG. 2, which may be alternatively used in the present invention, and includes three extruder units 1, 2 and 3 which are connected to an extrusion die head 5. In this instance, three kinds of unvulcanized rubbers A, B and C, which are different from each other in terms of blending compositions, are supplied to the extruder units 1, 2 and 3 from respective hoppers 1h, 2h and 3h, and caused to flow toward the extrusion die head 5. It is assumed that two kinds of unvulcanized rubbers are low conductive rubbers each containing silica as a rubber reinforcing agent, and the remaining land of unvulcanized rubber is a high conductive rubber containing a large amount of carbon black which is conventionally used as a rubber reinforcing agent. Thus, there may be instances in which the unvulcanized rubbers A, C are low conductive rubbers and the unvulcanized rubber B is a high conductive rubber, or in which the unvulcanized rubbers A, B are low conductive rubbers and the unvulcanized rubber C is a high conductive rubber.

In the case of a dual-type extruder as shown in FIG. 1, the unvulcanized rubbers A and B introduced into the extrusion die head 4 are caused to flow along respective passages 4a and 4b which are formed in the die head 4. The die head 4 includes insert block 10 and 11 which are detachably secured to the main body of the die head 4. The insert blocks 10 and 11 are included in a tread rubber forming means 7 in which the unvulcanized rubbers A and B are merged with each other to form an integrated composite body of the unvulcanized rubbers A and B. The composite body of the unvulcanized rubbers A and B is then continuously extruded from an extrusion orifice of the die head 4, in a direction which is denoted by arrow X. The extrusion orifice of the die head 4 is defined by a die plate 6 and a back die plate 6b which are retained in the die head 4. The die plate 6 is used to form the outer contour of the composite body, except its surface, while the back die plate 6b serves to form the outer contour of the composite body along its bottom surface. The tread rubber forming means 7 is comprised of the die plates 6 and 6b, die holders 8 and 9 for the die plates 6 and 6b, and insert blocks 10, 11.

Similarly, in the case of triple-type extruder as shown in FIG. 2, the unvulcanized rubbers A, B and C introduced into the extrusion die head 5 are caused to flow along respective passages 5a, 5b and 5c which are formed in the die head 5. The die head 5 includes insert blocks 10 and 11 which are detachably secured to the main body of the die head 5. The insert blocks 10 and 11 are included in a tread rubber forming means 7 in which the unvulcanized rubbers A, B and C are merged with each other to form an integrated composite body, which is then continuously extruded from the extrusion orifice of the die head 5, in a direction which is also denoted by arrow X. The extrusion orifice of the die head 5 is defined by a die plate 6 and a back die plate 6b which are accommodated in the die head 5. The arrangement of the tread rubber forming means 7 as a whole is essentially the same as that explained above.

The production method of unvulcanized tread rubber with the dual-type extruder according to the present invention will be explained below.

Figure 3:
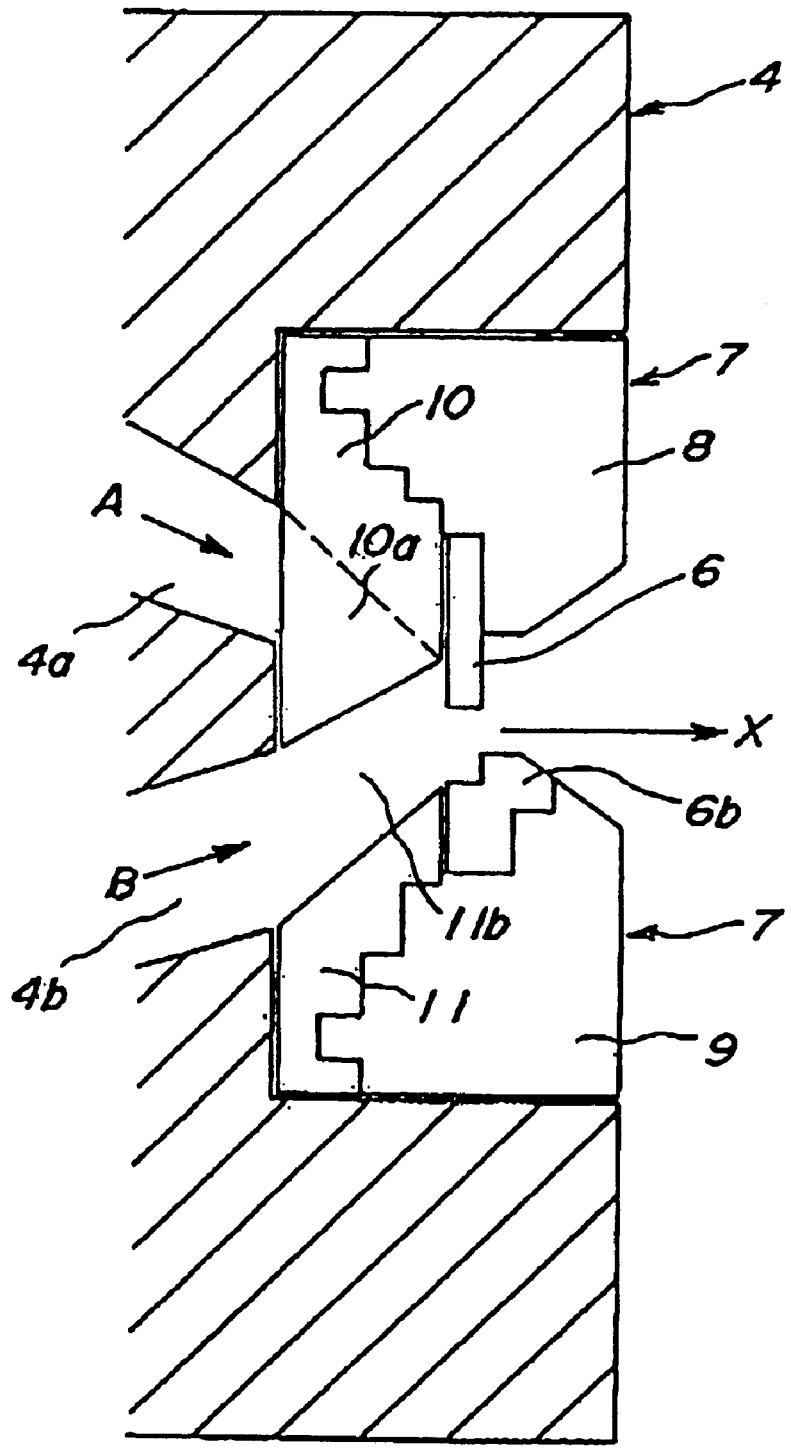
FIG. 3 is a sectional view, in enlarged scale, taken along the line III—III in FIG. 1 and showing the extrusion die head with an insert block.

As shown in FIG. 3, after the unvulcanized rubbers A and B have been supplied to the tread rubber forming means 7 through the passages 4a and 4b in the extrusion head 4, they are introduced, respectively, to a first passage 10a and a second passage 11b in the insert blocks 10, 11 which are situated at the back sides of the die plates 6 and 6b in contact therewith.

Figure 4:
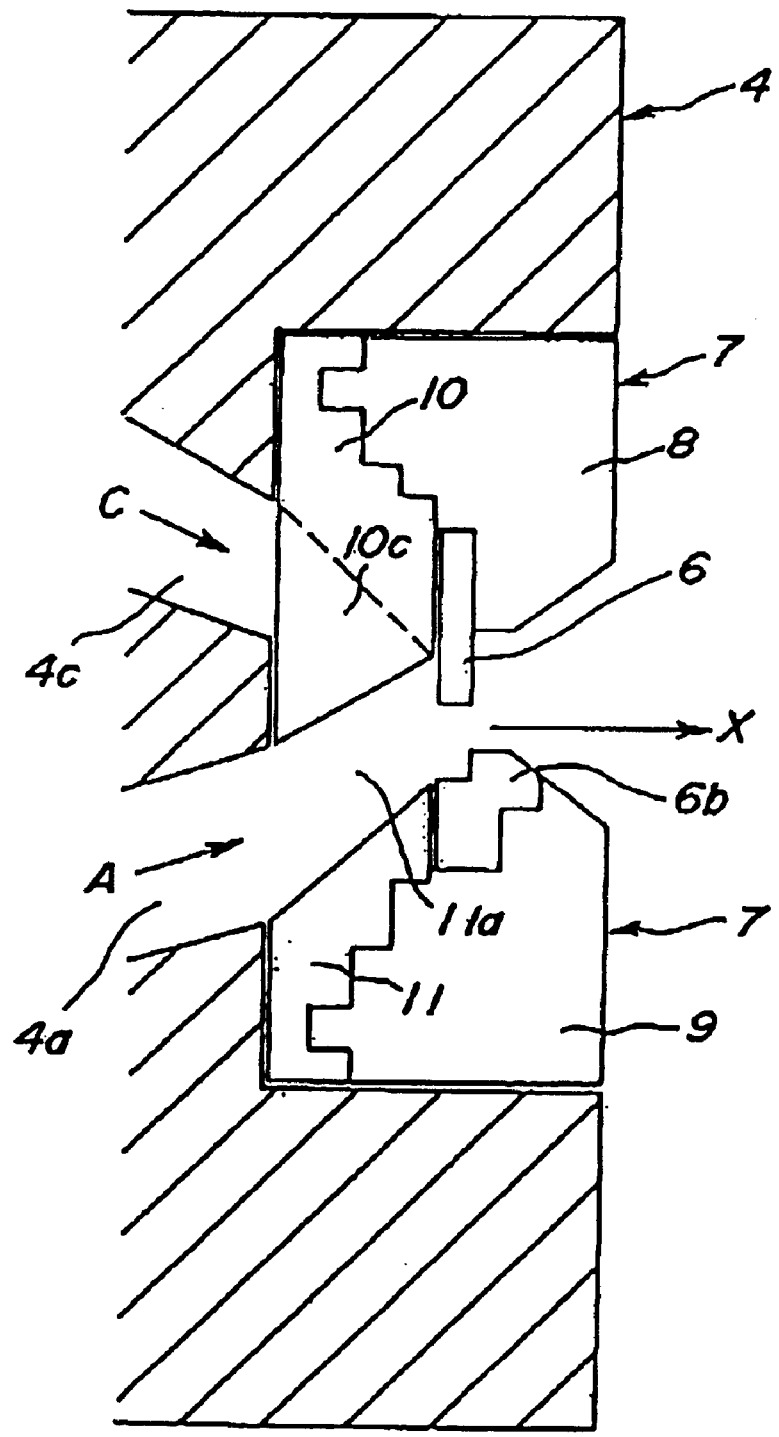
FIG. 4 is sectional view similar to FIG. 3, but showing a modified example of application.

A modification is shown in FIG. 4 wherein the unvulcanized rubber B is replaced with the unvulcanized rubber C of a different composition. In this case, the respective unvulcanized rubbers A and C are supplied to the tread rubber forming means 7 through the passages 4a and 4c in the extrusion die head 4, and then introduced, respectively, to a first passage 11a and a second passage 10c in the insert blocks 11 and 10 which are situated at the back sides of the die plates 6, 6b in contact therewith.

The passages for the unvulcanized rubbers A and B in the extrusion die head 4 will be more fully explained below.

Figure 5:
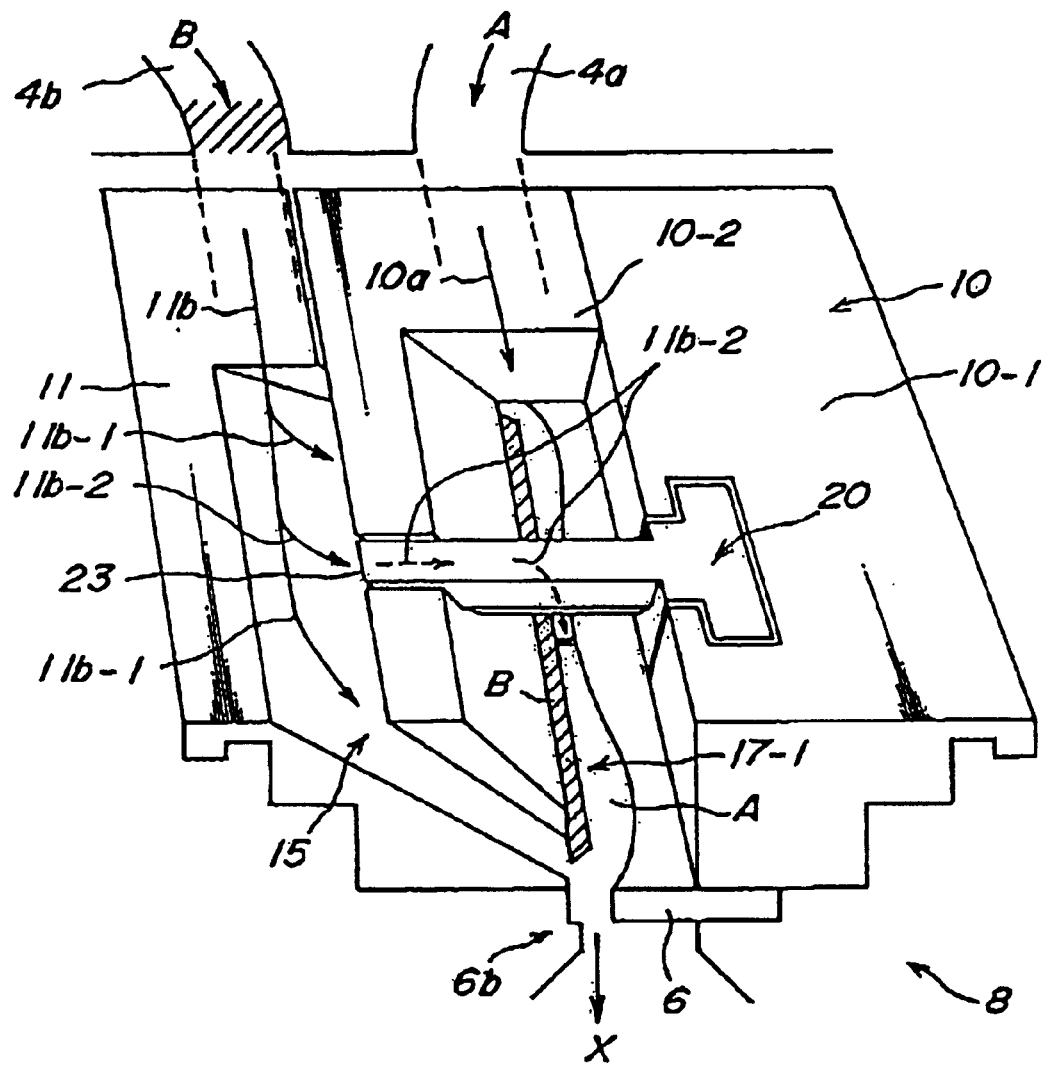
FIG. 5 is a perspective view, as seen obliquely from the upper rear side, of the extrusion die head shown in FIG. 3.

With reference to FIG. 5, the unvulcanized rubber A is caused to flow through the first passage 10a and then discharged toward the extrusion orifice defined between the die plate 6 and the back die plate 6b, from a recessed portion of the passage 10a at the back sides of the die plates 6 and 6b. In this case, the unvulcanized rubber A forms a cap rubber portion arranged on a tread surface side in the product tire. The insert block 10 may be divided into two pieces 10-1 and 10-2, as shown in FIG. 5, in order to facilitate machining of the recessed portion of the passage 10a. The insert block 10 divided into two pieces 10-1 and 10-2 serves also to facilitate removal of the residual unvulcanized rubber A and cleaning of the rubber passage, after the tread rubber forming means 7 has been removed from the extrusion die head 4.

On the other hand, the unvulcanized rubber B is caused to flow along the second passage 11b which includes a passage portion 11b-1 on the downstream side of the junction in its intermediate portion to be described below. The passage portion 11b-1 is defined by an inclined surface of the insert block 11 in the form of a notched recess, and an inclined surface of the insert block 10 opposite to the insert block 11, and located on the back side of the back die plate 6b. The unvulcanized rubber B is then discharged toward the extrusion orifice defined between the die plate 6 and the back die plate 6b and merged with the unvulcanized rubber A to form an integrated composite body 17-1. In this case, the unvulcanized rubber B forms a base rubber portion arranged below the cap rubber portion of the product tire.

As her shown in FIG. 5, a third passage 11b-2 is branched from the second passage 11b at its intermediate portion, so that the unvulcanized rubber B flowing through the second passage 11b is partly introduced into the third passage 11b-2. To this end, for example, a sub-insert block 20 is detachably secured to the insert block 10 and bridged across the first passage 10a for the unvulcanized rubber A along the inclined surface of the insert block 10, i.e., the notched recess in the insert block piece 10-2. The respective end surfaces of the insert blocks 10, 11 and the sub-insert block 20 are preferably arranged in a common plane.

With reference to FIGS. 6 to 8, the sub-insert block 20 has a base portion 21 which is received in a cutout in the insert block piece 10-1 of the insert block 10. A thin-walled hollow sheath portion 22 extends from the base portion 21, and has a free end which is received in a cutout in the insert block piece 102 The free end of the sheath portion 22 of the sub-insert block 20 provides an inlet 23 of the third passage 11b-2, which is opened into the concave portion 15 of the second passage 11b. The sheath portion 22 of the sub-insert block 20 has an inner space 24 which defines the third passage 11b-2 for the unvulcanized rubber B.

As further shown in FIGS. 6 to 8, the inlet 23 for the unvulcanized rubber B at the free end of the sheath portion 22 may be inclined in conformity with the inclined surface of the concave portion 15 on a side of the back die plate 6b, so as to facilitate introduction of the unvulcanized rubber B into the third passage 11b-2. The inner space 24 in the sheath portion 22 may be tapered toward the bottom portion opposed to the extruding dies 6, 6b so that the slit-like opening 25 has a width w which is preferably within a range from 0.8 to 45 mm, and a length which is made longer than the height of the die plates 6, 6b. The opening 25 is located adjacent to the back sides of the die plates 6, 6b when the sub-insert block 20 is secured to the insert block During the passage of the unvulcanized rubber B through the second passage 11b, the rubber B is partly introduced from the inlet 23 into the third passage 11b-2 in the sheath portion 22 of the sub-insert block 20. The rest of the unvulcanized rubber B is caused to pass through the second passage portion 11b-1 on the downstream side of the inlet 23. The unvulcanized rubber B introduced into, and passed through the inner space 24 of the hollow sheath pardon 22 of the sub-insert block 20 is extruded toward the extrusion orifice of the die plates 6 and 6b, from a slit-like narrow opening 25 in the wall of the sheath portion 22 of the sub-insert block 20, as shown in FIGS. 7 to 9. The slit-like opening 25 is arranged adjacent to the back sides of the die plates 6, 6b, and has a cross-section which is substantially straight in the height direction of the die head. Thus, the third passage 11b-2 extends from the inlet 23 of the sub-insert block 20 to the extrusion orifice defined by the die plates 6, 6b, through the slit-like opening 25 in the subinsert block 20.

The portion of the third passage 11b-2 in the sub-insert block 20, which extends from the inlet 23 to the slit-like opening 25 is formed as an independent branch passage which is completely isolated from the first passage 10a and the second passage 11b by the wall of the sheath portion 22 of the sub-insert block 20. Therefore, the unvulcanized rubber B flowing through the third passage 11b-2 in the hollow sheath portion 22 of the sub-insert block 20 is not affected by the flow of the unvulcanized rubbers A and B through the first passage 10a and the second passage 11b-1.

The unvulcanized rubber B discharged from the slit-like opening 25 of the hollow sheath portion 22 is merged with the unvulcanized rubbers A and B passed through the passages 10a and 11b-1, at a location on the back side of the die plates 6, 6b. The high conductive unvulcanized rubber B passed through the second passage 11b-1 form the base rubber portion in the integrated composite body 17-1 of unvulcanized rubbers, as shown by the hatched region in FIG. 5. On the other hand, the unvulcanized rubber B passed through the third passage 11b-2 forms a narrow strip of high conductive rubber, which extends through the low conductive unvulcanized rubber A over its entire thickness to divide the unvulcanized rubber A in the widthwise direction of the composite body 17-1. The narrow rubber strip of the high conductive rubber B is located substantially at the widthwise center region of the composite body 17-1.

Another embodiment of the dual-type extruder is shown in FIG. 9, in which the extrusion die head 4 is provided with passages for the unvulcanized rubbers A and C which are arranged in the following manner. The low conductive unvulcanized rubber A is caused to flow through the first passage 11a and discharged toward the extrusion orifice defined by the die plate 6 and the back die plate 6b, from a concave portion of the passage 11a. The concave portion of the passage 11a is formed by an inclined surface of the insert block 11 on the back sides of the die plates 6, 6b, and an inclined surface of the insert block 10, which are opposite to each other. In this case, the low conductive unvulcanized rubber A forms a unitary tread rubber in the product tire.

On the other hand, the high conductive unvulcanized rubber C is caused to flow along the second passage 10c which is divided into two sub-passages. The unvulcanized rubber C is then discharged toward the extrusion orifice between the die plates 6 and 6b, from the concave portion on the back side of the die plates 6, 6b on both sides with respect to the width direction. Thus, the unvulcanized rubber C is merged with the unvulcanized rubber A on both sides thereof, to form an integrated composite body 17-2 of the unvulcanized rubbers A and C. In this case, the high conductive unvulcanized rubber C forms a pair sub-sidewall rubbers on both sides of the tread rubber in the product tire.

As further shown in FIG. 9, a third passage 10c-1 is branched from one of the sub-passages of the second passage 10c at its the intermediate portion, so that the high conductive unvulcanized rubber C flowing through the second passage 10c is partly introduced into the third passage 10c-1. To this end, for example, a sub-insert block 30 is detachably secured to the insert block 10 at a notched recess 16 therein, and bridged across the first passage 11a along the inclined surface of the insert block 11. The respective surfaces of the insert block 10, 11 and the sub-insert block 30 are preferably arranged in the same plane.

With reference to FIGS. 10 to 13, the sub-insert block 30 has a base portion 31 which is detachably received in the notched recess 16 of the insert block 10. A hollow sheath portion 32 extends from the base portion 31 toward the inclined surface of the insert block 11. An inlet 33 for the unvulcanized rubber C is formed in the based portion 31, and opened to the remaining space in the notched recess 16. The sheath portion 32 of the sub-insert block 30 has an inner space 34 which defines the third passage 10c-1 for the unvulcanized rubber C.

A tapered hollow portion as indicated by broken line in FIG. 10 is formed in the base portion 31 of the sub-insert block 30 such that the distance between opposite inner wall is gradually decreased from the inlet 33 toward the hollow sheath portion 32. As a result, the unvulcanized rubber C flowing from the inlet 33 toward the sheath portion 32 is throttled.

The sheath portion 32 of the sub-insert block 30 is provided with a slit-like opening 35 from which the unvulcanized rubber C is discharged. The slit-like opening 35 is arranged adjacent to the back sides of the die plates 6 and 6b, when the sub-insert block 30 is secured to the insert block The slit-like opening 25 has a cross-section which is substantially straight in the height direction of the die head, and a width w which is preferably within a range from 0.8 to 4.5 mm.

During the passage of the unvulcanized rubber C through the second passage 10c, the rubber C is partly introduced into the third passage 10c-1 from the inlet 33 and discharged from the slit-like opening 35 toward the extrusion orifice defined by the die plates 6 and 6b. The third passage 10c-1 extends from the inlet 33 of the sub-insert block 30 to the extrusion orifice between the die plates 6, 6b, through the inner space 34 of the sheath portion 32 and the slit-like opening 35.

The portion of the third passage 10c-1 in the sub-insert block 30, which extends from the inlet 33 to the slit-like opening 35 is formed as an independent branch passage which is completely isolated from the first passage 11a and the second passage 10c by the walls of the base portion 31 and the sheath portion 32 of the sub-insert block 30. Therefore, the unvulcanized rubber C flowing through the third passage 10c-1 in the hollow sheath portion 32 of the sub-insert block 30 is not affected by the flow of the unvulcanized rubbers A, C through the first passage 11a and the second passage 10c.

The unvulcanized rubber C discharged from the slit-like opening 35 is merged with the unvulcanized rubber A passed through the first passage 11a, at a location on the back side of the die plates 6, 6b, so as to form an integrated composite body 17-2. The unvulcanized rubber C passed through the third passage 10c-1 forms a narrow strip of high conductive rubber, which extends through the low conductive unvulcanized rubber A over its entire thickness to divide the unvulcanized rubber A in the widthwise direction of the composite body 17-2. The narrow rubber strip of the high conductive rubber B is located substantially at the widthwise center region of the composite body 17-2.

Next, the production method of unvulcanized tread rubber with the triple-type extruder according to the present invention will be explained below.

Figure 14:
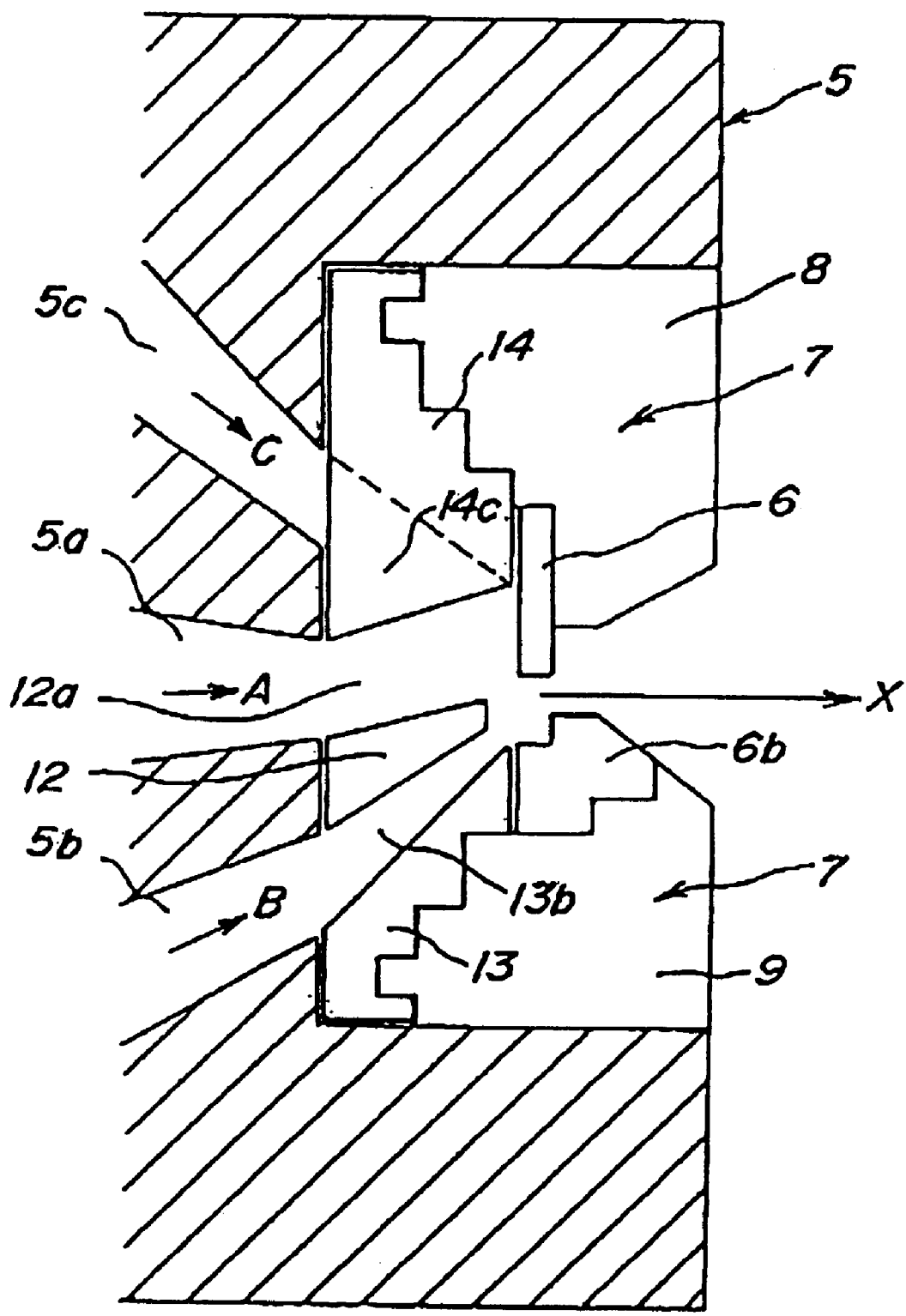
FIG. 14 is a sectional view, in enlarged scale, of the extrusion die head taken along the line XIV—XIV in FIG. 2.

As shown in FIG. 14, after the unvulcanized rubbers A, B and C have been supplied to the tread rubber forming means 7 through the passages 5a, 5b and 5c in the extrusion head 5, they are introduced, respectively, to a first passage 12a, a second passage 13b and a third passage 14c in the insert blocks 12, 13 and 14 which are situated at the back sides of the die plates 6 and 6b in contact therewith. The tread rubber forming means 7 is comprised of the die plates 6 and 6b, die holders 8 and 9 for the die plates 6 and 6b, and insert blocks 12, 13 and 14, and serves to form an integrated composite body of unvulcanized rubbers and extrude it from an extrusion orifice defined by the die plates 6 and 6b in the direction indicated by arrow X.

The passages for the unvulcanized rubbers A, B and C in the extrusion die head 5 will be more fully explained below.

Figure 15:
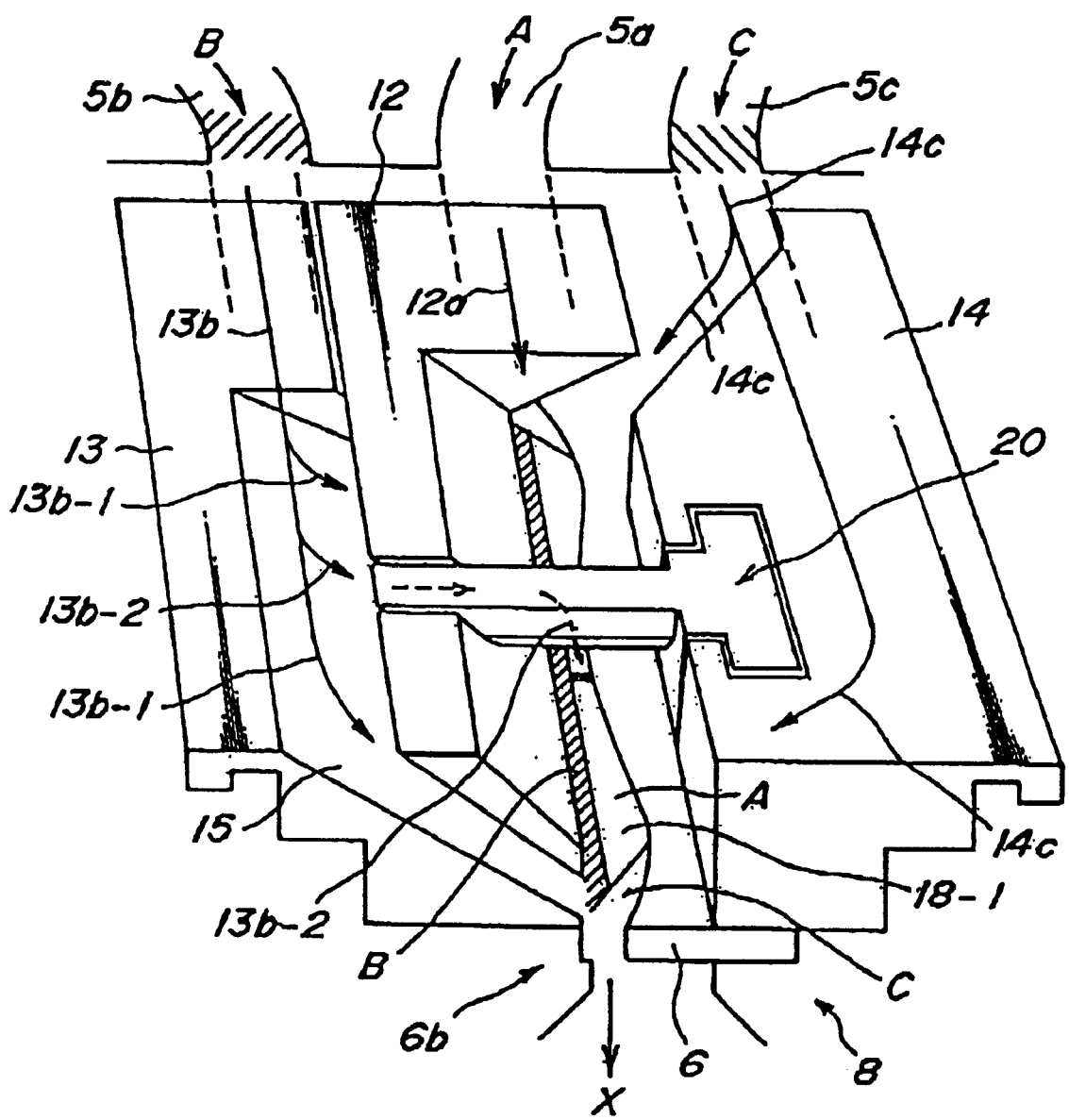

With reference to FIG. 15, the unvulcanized rubber A is caused to flow through the first passage 12a and then discharged toward the extrusion orifice defined between the die plate 6 and the back die plate 6b, from a recessed portion of the passage 10a at the back sides of the die plates 6 and 6b. In this case, the unvulcanized rubber A comprises a low conductive unvulcanized rubber containing a large amount of silica as a rubber-reinforcing agent, and forms a cap rubber portion arranged on a tread surface side in the product tire.

The unvulcanized rubber C comprises a low conductive unvulcanized rubber containing a large amount of silica as a rubber-reinforcing agent, and forms a pair of sub-sidewall rubbers arranged on both sides of the tread rubber in the product tire. The unvulcanized rubber C is caused to flow through the second passage 14c which is divided into two sub-passages, and then discharged toward the extrusion orifice between the die plates 6 and 6b, from respective recessed portions (one of which is omitted in FIG. 15) on the back sides of the die plates 6, 6b6b on both sides with respect to the width direction. Thus, the low conductive unvulcanized rubber C forming the sub-sidewall rubbers is merged with the unvulcanized rubber A on both sides thereof, to form an integrated composite body 181 of the unvulcanized rubbers A and C. As an alternative example, the unvulcanized rubber C for the sub-sidewall rubbers may comprise a high conductive unvulcanized rubber containing a large amount of carbon black as a rubber-reinforcing agent.

The unvulcanized rubber B comprises a high conductive unvulcanized rubber containing a large amount of carbon black as a rubber-reinforcing agent. The unvulcanized rubber B is caused to flow through the third passage 13b which includes a passage portion 13b-1 on the downstream side of the junction in its intermediate portion to be described below. The passage portion 13b-1 is defined by an inclined surface of the insert block 13 in the form of a notched recess 15, and an inclined surface of the insert block 12 opposite to the insert block 13, and located on the back side of the back die plate 6b. The unvulcanized rubber B is then discharged toward the extrusion orifice between the die plates 6, 6b and merged with the unvulcanized rubbers A and C to form an integrated composite body 18-2. In this case, the unvulcanized rubber B forms a base rubber portion arranged below the cap rubber portion of the product tire.

As further shown in FIG. 15, a fourth passage 13b-2 is branched from the third passage 13b-1 at its intermediate portion, so that the unvulcanized rubber B is partly introduced into the fourth passage 13b-2. To this end, the extrusion die bead 5 is detachably provided with the sub-insert block 20 which has been explained with reference to FIGS. 6 to 8. The sub-insert block 20 is bridged across the first passage 12a for the unvulcanized rubber A along the inclined surface of the insert block 12, with the inlet 23 opened to the concave portion 15 of the third passage 13b-1.

The portion of the fourth passage 13b-2 in the sub-insert block 20, which extends from the inlet 23 to the slit-like opening 25 is completely isolated from the first passage 12a, the second passage 14c, and the third passage 13b-1 by the wall of the hollow sheath portion 22 of the sub-insert block 20. Thus, the unvulcanized rubber B flowing through the fourth passage 13b-2 is not affected by the unvulcanized rubbers A, C and B flowing through the first passage 12a, the second passage 14c and the third passage 13b-1, respectively, and then merged with the unvulcanized rubbers A, B which have passed through the passages 12a, 14c, 13b-1 on the back side of the extrusion die plates 6 and 6b.

The unvulcanized rubber B that passed through the fourth passage 13b-2 forms a narrow strip of high conductive rubber, which extends through the low conductive unvulcanized rubber A over its entire thickness to divide the unvulcanized rubber A in the widthwise direction of the composite body 17-1. The narrow rubber strip of the high conductive rubber B is located substantially at the widthwise center region of the composite body 18-1.

Another embodiment of the method for producing unvulcanized tread rubber with a triple-type extruder will be explained with reference to FIG. 16, in which the extrusion die head 5 is also provided with passages for unvulcanized rubbers A, B and C. In this instance, the unvulcanized rubber A is caused to flow through the first passage 12a and discharged toward the extrusion orifice between the die plates 6 and 6b, from the concave portion 15 formed by opposite inclined surfaces of the insert blocks 12, 13 at the back sides of the die plates 6 and 6b. The unvulcanized rubber A is a low conductive rubber and forms a tread cap rubber in the product tire.

The unvulcanized rubber B is caused to flow through a second passage 13b and then discharged toward the extrusion orifice between the die plates 6 and 6b, from a slightly inclined surface region of the concave portion 15 on the back side of the die 6 plate. That is, the unvulcanized rubbers A, B are merged with each other at the concave portion 15. The insert blocks 12, 13 are shown as being separate blocks, though they may be formed as a single block.

In the illustrated embodiment, the unvulcanized rubbers A and B each comprises a low conductive rubber containing a large amount of silica as a rubber-reinforcing agent, in which the unvulcanized rubber A forms a tread cap rubber and the unvulcanized rubber B forms a base rubber in the product tire. However, if necessary, the unvulcanized rubber B may comprise a high conductive unvulcanized rubber containing a large amount of carbon black as a rubber-reinforcing agent.

On the other hand, the unvulcanized rubber C comprises a high conductive rubber containing a large amount of carbon black and forms a pair of sub-sidewall rubbers arranged on both sides of the tread rubber in the product tire, which are connected to main sidewall rubbers. The unvulcanized rubber C is caused to flow through the third passage 14c which is divided into two sub-passages. The unvulcanized rubber C is then discharged toward the extrusion orifice between the die plates 16 and 16b, from two concave portions (one of which is omitted in FIG. 16) on the back sides of the die plates 6, 6b, on both sides with respect to the width direction. Thus, the unvulcanized rubber C is merged with the unvulcanized rubbers A, B to form an integrated composite body 182.

Figure 16:
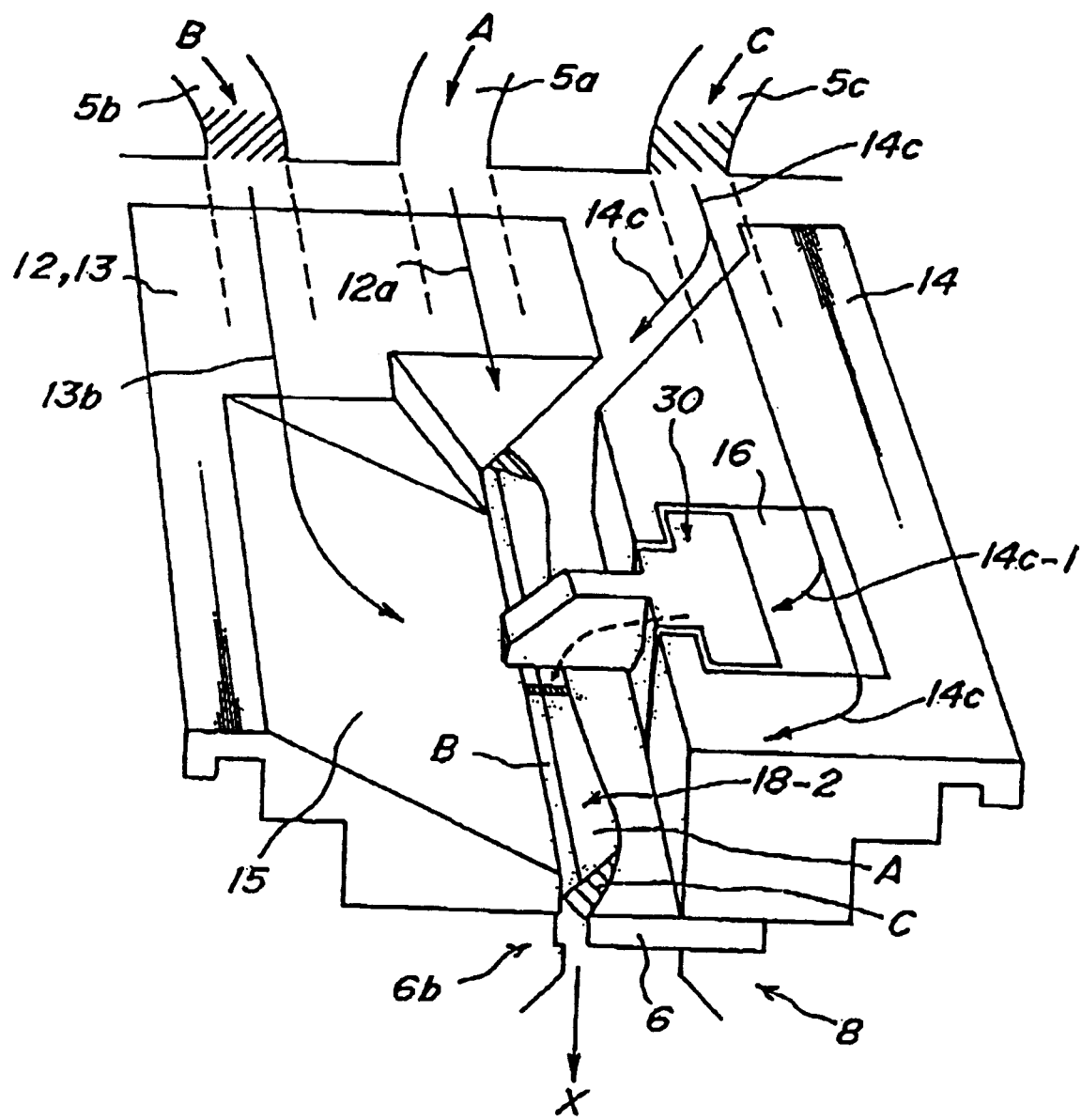
FIG. 16 is a perspective view similar to FIG. 15 but showing another example of the insert block.

As further shown in FIG. 16, a fourth passage 14c-1 is branched from one of the sub-passages of the third passage 14c at its intermediate portion, so that the unvulcanized rubber C flowing through the third passage 14c is partly introduced into the fourth passage 14c-1. To this end, for example, the extrusion die head 5 is detachably provided with the sub-insert block 30 which has been explained with reference to FIGS. 10 to 13. Thus, the unvulcanized rubber C flowing through the third passage 14c is partly introduced into the fourth passage 14c-1 from the inlet 33 in the base portion 31 of the sub-insert block 30, and discharged from the hollow sheath portion 32 through the slit-like opening 35 which is situated adjacent to the extrusion orifice defined between the die plates 6 and 6b.

The portion of the fourth passage 14c-1 in the sub-insert block 30, which extends from the inlet 33 to the silt-like opening 35 is completely isolated not only from the third passage 14c but also from the first passage 12a and the second passage 13b by the walls of the base portion 31 and the sheath portion 32 of the sub-insert block 30. Thus, the unvulcanized rubber C flowing through the fourth passage 14c-1 is not affected by the unvulcanized rubbers A, B and C flowing through the first passage 12a, the second passage 13b and the third passage 14c, respectively, and then merged with the unvulcanized rubbers A, B which have passed through the passages 12a, 13b, 14c on the back side of the die plates 6 and 6b.

The unvulcanized rubber C which passes through the fourth passage 14c-1 forms a narrow strip of high conductive rubber, which extends through the low conductive unvulcanized rubber A over its entire thickness to divide the unvulcanized rubber A in the widthwise direction of the composite body 18-2. The narrow rubber strip of the high conductive rubber B is located substantially at the widthwise center region of the composite body 18-2.

In each of the illustrated embodiments described above, the high conductive unvulcanized rubber is caused to flow through the branched passage 11b-2, 10c-1, 13b-2, 14c-1 in the sheath portion 24, 34 of the sub-insert block 20, 30 having a cross-sectional area which is smaller than the cross-sectional area of other passages, the other portions, and discharged toward the die plates 6 and 6b from the narrow slit-like opening 25, 35. Therefore, the high conductive unvulcanized rubber is caused to flow through the branched passage 11b-2, 10c-1, 13b-2, 14c-1 is subjected to a flow resistance which is remarkably higher than the resistance at the other passages for passing unvulcanized rubbers for a single tread rubber, a tread cap rubber or a base rubber.

The extrusion pressure of the high conductive unvulcanized rubber subjected to a higher flow resistance becomes lower than the extrusion pressure of the other unvulcanized rubber subjected to a lower flow resistance. Therefore, the flow speed of the high conductive unvulcanized rubber extruded from the narrow slit-like opening 25, 35 of the sub-insert block 20, 30 is remarkably lower than the flow speed of the unvulcanized rubber passed through other passages. As a result, the high conductive unvulcanized rubber extruded from the slit-like opening 25, 35 is compressed by adjacent rubbers and thereby stretched toward the extrusion orifice between the die plates 6, 6b, i.e., in the extrusion direction.

The high conductive unvulcanized rubber compressed by adjacent rubbers and stretched in the extrusion direction has a gauge which is much smaller than the width w of the slit-like opening portion 25, 35. Thus, a strip of high conductive unvulcanized rubber having a remarkably narrow width can be continuously formed in the low conductive unvulcanized rubber in the extruded integrated composite body 17-1, 17-2, 18-1, 18-2 of unvulcanized rubbers. The length of the slit-like opening 25, 35 with respect to the height of the extrusion orifice as defined by the die plates 6 and 6b, and the location of the slit-like opening 25, 35 relative to the extrusion orifice can be properly determined so that the strip of the high conductive unvulcanized rubber is exposed to the tread surface and the bottom surface of the composite body 17-1, 17-2, 18-1, 18-2 or, in contact with the bottom surface when it comprises a high conductive unvulcanized rubber.

When the width w of the slit-like opening 25, 35 is made constant in the length direction, it is possible to form a strip of high conductive unvulcanized rubber having a substantially constant gauge Moreover, by adjusting the location of the sheath portion 22, 32 of the sub-insert block 20, 30, a strip of high conductive unvulcanized rubber can be formed at a desired widthwise location which is practically in the center region of the integrated composite body 17-1, 17-2, 18-1, 18-2 of unvulcanized rubbers. If desired, a plurality of the sub-insert blocks 20, 30 may be provided to form a plurality of high conductive unvulcanized rubber strips.

From economical viewpoint, composite body 17-1, 17-2, 18-1, 18-2 of unvulcanized rubbers for tread rubbers with the desired very thin gauge high conductive rubber strip can be produced according to the present invention at a minimized cost, because it is only required to provide the sub-insert block 20, 30 of a simple structure, which is detachably secured to existing insertblock 10 (10-1, 10-2), 12, 14.

Also, formation of the independent branch passage in the sub-insert block 20, 30 eliminates requirement for an entirely new extruder which is expensive and occupies a considerably wide space. Thus, the present invention serves to reduce the equipment investment and saves the space.

FIGS. 17 to 20 show cross-sections of the unvulcanized tread rubber which have been exuded as an integrated composite body by the method described above. In these figures, the portions of the unvulcanized tread rubbers formed of high conductive unvulcanized rubber are indicated by hatching lines.

Figure 17:
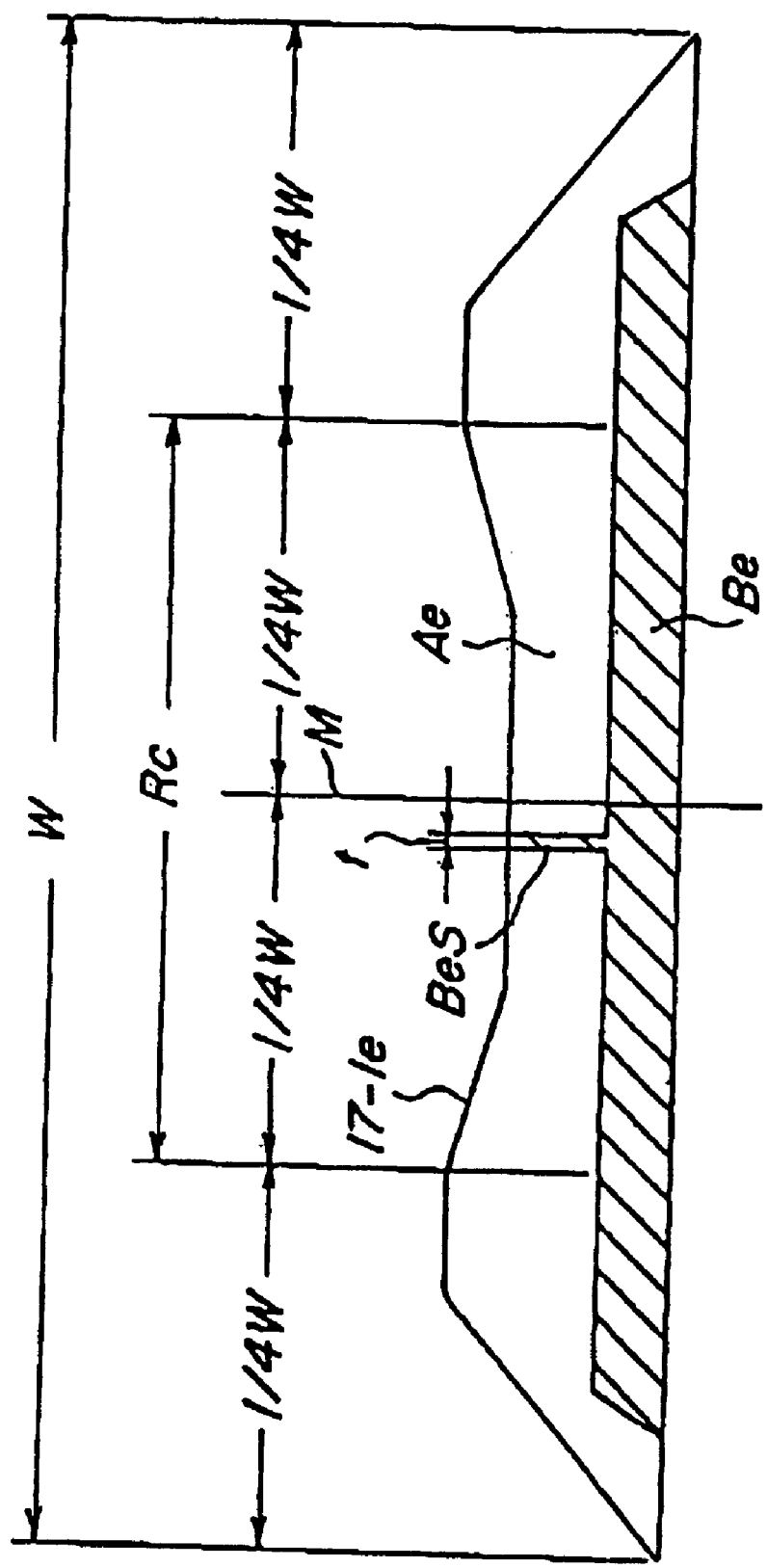
FIG. 17 is a sectional view of an unvulcanized tread rubber obtained by extruding unvulcanized rubbers from the extrusion die head shown in FIG. 5.

The unvulcanized tread rubber 17-1e shown in FIG. 17 comprises an integrated composite body which has been formed by the extrusion die head shown in FIG. 5. The unvulcanized tread rubber 17-1 includes a low conductive unvulcanized rubber Ae forming a tread cap rubber portion, an high conductive unvulcanized rubber Be forming a base rubber portion, and a high conductive unvulcanized rubber strip BeS having a very thin gauge t integrated with the high conductive unvulcanized rubber Be and extending substantially vertically so as to be exposed to the tread surface of the unvulcanized tread rubber 17-1e.

Figure 18:
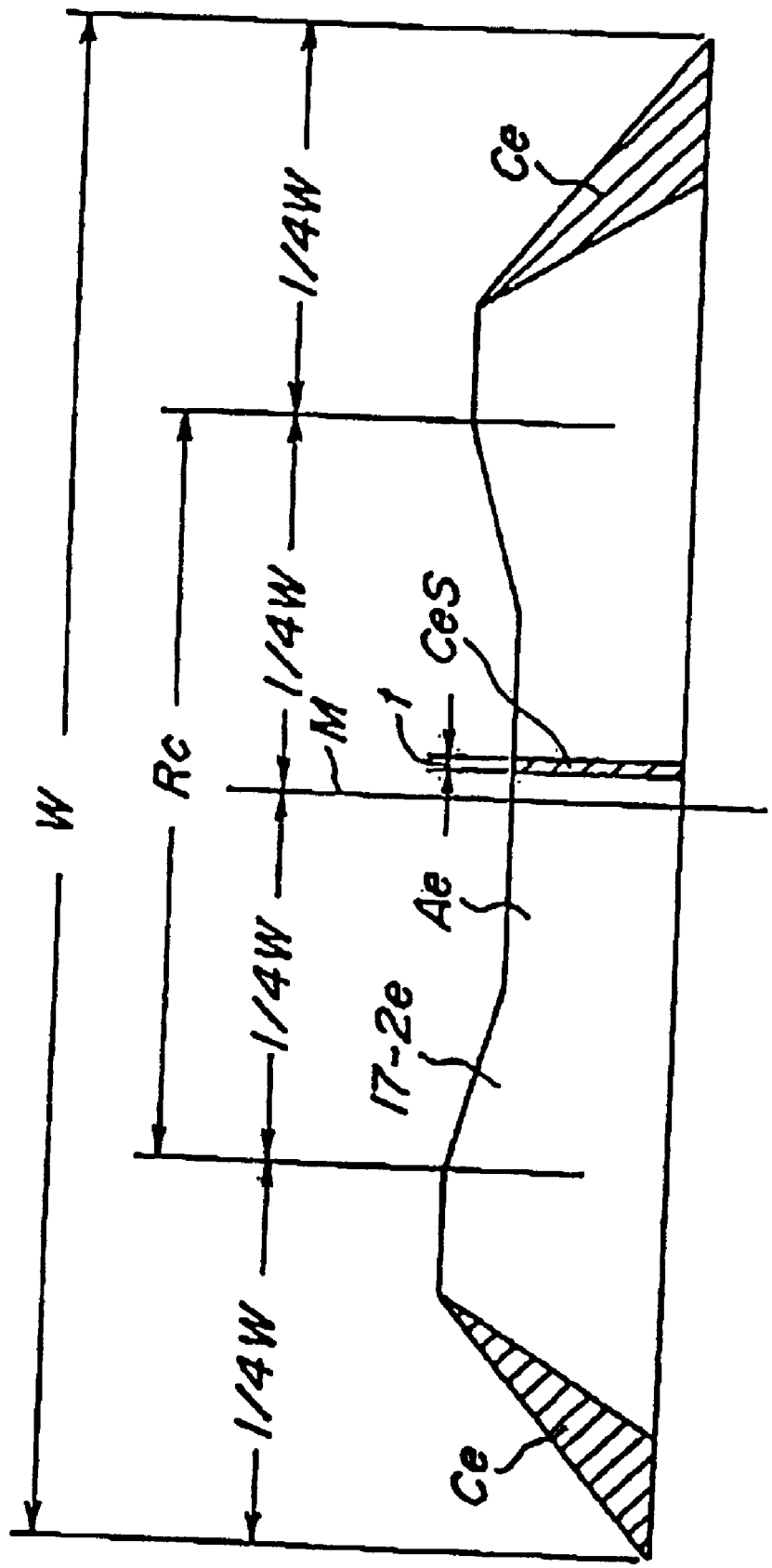
FIG. 18 is a sectional view of an unvulcanized tread rubber obtained by extruding unvulcanized rubbers from the extrusion die head shown in FIG. 6.

The unvulcanized tread rubber 17-2e shown in FIG. 18 comprises an integrated composite body which has been formed by the extrusion die head shown in FIG. 9. The unvulcanized tread rubber 17-2e includes a low conductive unvulcanized rubber Ae forming a tread rubber portion of a unitary structure, a pair of sub-sidewall portions Ce of high conductive rubber arranged on both sides of the tread rubber portion Ae so as to be connected to the sidewall rubbers in the product tire, and a high conductive unvulcanized rubber strip CeS having a very thin gauge t and extending substantially vertically so as to be exposed to the tread surface of the unvulcanized tread rubber 17-2e.

Figure 19:
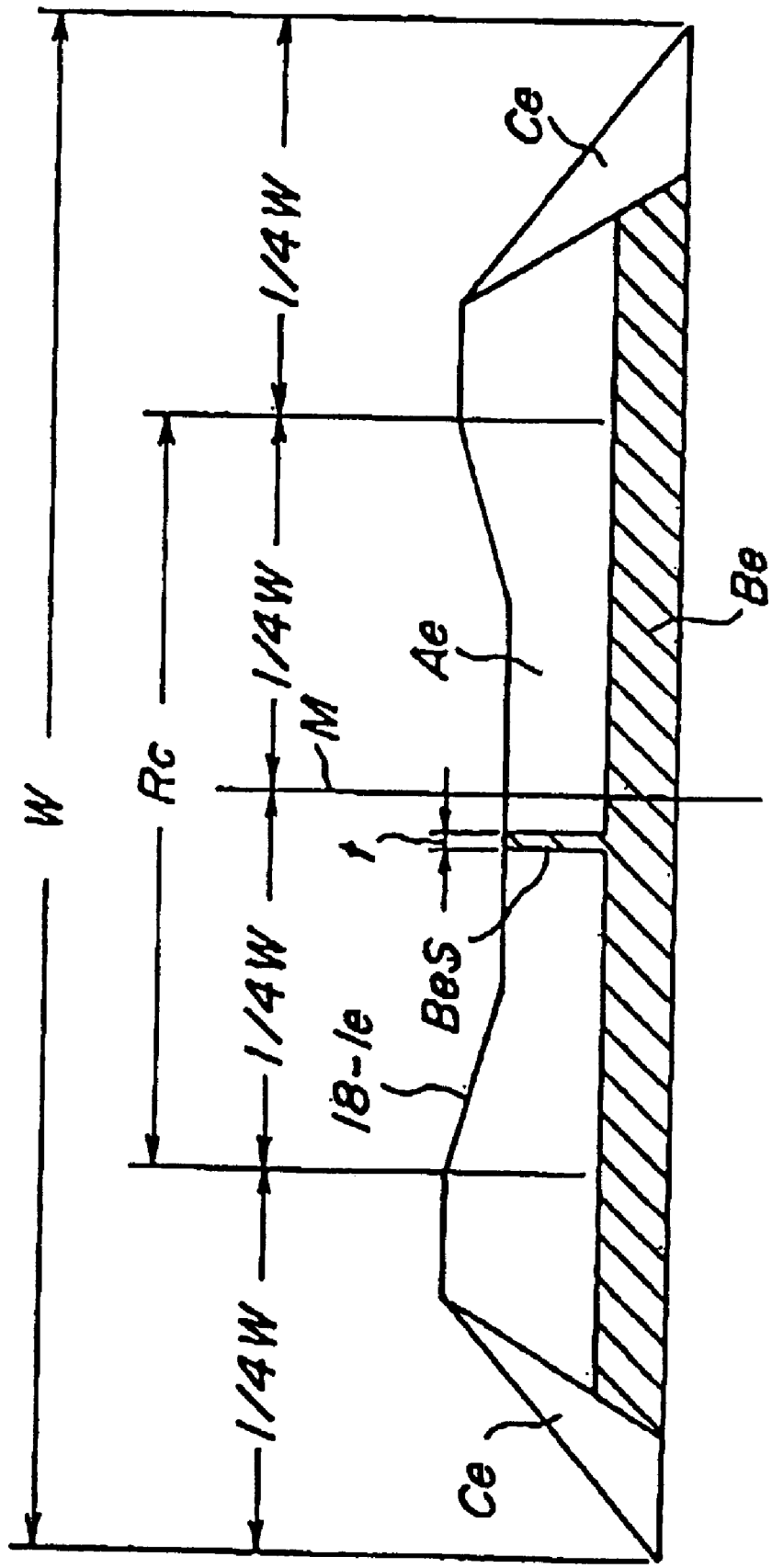
FIG. 19 is a sectional view of an unvulcanized tread rubber obtained by extruding unvulcanized rubbers from the extrusion die head shown in FIG. 15.

The unvulcanized tread rubber 18-1e shown in FIG. 19 comprises an integrated composite body which has been formed by the extrusion die head shown in FIG. 15. The unvulcanized tread rubber 18-1e includes a low conductive unvulcanized rubber Ac forming a tread cap rubber portion, a high conductive rubber Be forming a base rubber portion, a pair of sub-sidewall portions Ce of low conductive rubber arranged on both sides of the unvulcanized rubbers portions Ae, Be so as to be connected to the sidewall rubbers in the product tire, and a high conductive unvulcanized rubber strip BeS having a very thin gauge t and extending substantially vertically so as to be exposed to the tread surface of the unvulcanized read rubber 18-1e.

Figure 20:
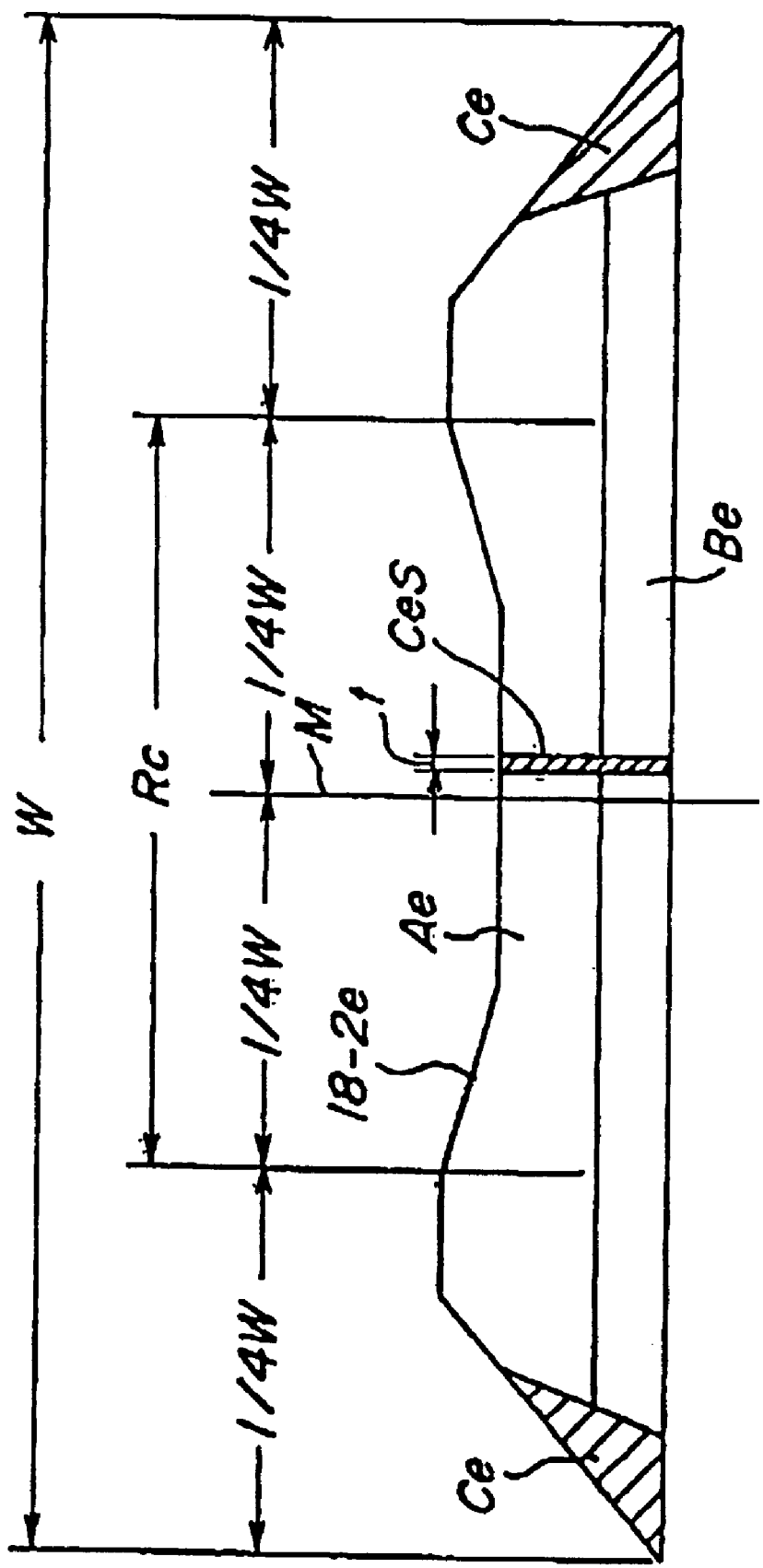
FIG. 20 is a sectional view of an unvulcanized tread rubber obtained by extruding unvulcanized rubbers from the extrusion die head shown in FIG. 16.

The unvulcanized tread rubber 18-2e shown in FIG. 20 comprises an integrated composite body which has been formed by the extrusion die head shown in FIG. 16. The unvulcanized tread rubber 18-2e includes a low conductive unvulcanized rubber Ae forming a tread cap rubber portion, a low conductive unvulcanized rubber Be morning a base rubber portion, a pair of sub-sidewall portions Ce of high conductive rubber arranged on both sides of the unvulcanized rubber portions Ac, Be so as to be connected to the sidewall rubbers in the product tire, and a high conductive unvulcanized rubber strip CeS having a very thin gauge t and extending substantially vertically so as to be exposed to the tread surface of the unvulcanized tread rubber 18-2e.

In the embodiments shown FIGS. 18 to 20, when the extruded unvulcanized tread rubbers 17-1e, 17-2e, 18-1e, 18-2e have been stabilized in size, the high conductive unvulcanized rubber strips BeS, CeS are located in the center region Rc of the unvulcanized tread rubbers, which is defined as two 1/4W regions on both sides of the widthwise center line M. The high conductive unvulcanized rubber strip layer BeS, CeS extends continuously in the longitudinal direction of the extruded unvulcanized tread rubber. By adjusting the width w of the narrow slit-like opening 25, 35 of the sub-insert block 20, 30 and the extrusion pressure at the hollow sheath portion 24, 25 adjacent to the slit-like opening 25, 35, it is possible to form the high conductive unvulcanized rubber strip BeS, CeS having a very small thickness which is within a range from 0.05 to 3.5 mm.

The low conductive unvulcanized rubber contains silica and carbon lack, in which the content of silica is not less than 40 PHR, preferably 50 to 90 PHR, and the content of carbon black is not more than 30 PHR, preferably 5 to 25 PHR. Other rubber composition and chemical composition may be determined in a conventional manner. An exemplary composition of the low conductive unvulcanized rubber Ae for a tread rubber of unitary structure or for a tread cap rubber is shown in Table 1. An exemplary composition example of the high conductive unvulcanized rubber strip BeS is shown in Table 2 with respect to the thickness t of 0.2 mm and 20 mm.

TABLE 1

| COMPOSITION | LOW CONDUCTIVE RUBBER Ae |
|---|---|
| Styrene-butadiene rubber *1 | 96 (parts by weight) |
| Butadiene rubber *2 | 30 |
| Silica (SiO$_2$) *3 | 60 |
| Carbon black (N234) *4 | 20 |
| Silica coupling agent *5 | 6 |
| Zinc oxide | 3 |
| Stearic acid | 2 |
| Aromatic oil | 10 |
| Vulcanization accelerator (CBS) *6 | 1.5 |
| Vulcanization accelerator (DPG) *7 | 2 |
| Sulfur | 1.6 |
| Volumetric resistivity ρ (Ω.cm) at 25° C. | $5.0 \times 10^8$ |

*1 SBR1712 made by JSR Corp.
*2 96% cis-bond
*3 Nipsil VN3 made by Nippon Silica Co., Ltd.
*4 N$_2$SA:126 m$^2$/g, DPB: 125 cc/100 g
*5 Si69 made by Degussa in Germany
*6 N-cyclohexyl-2-benzothiazyl sulfenamide
*7 diphenyl guanidine

TABLE 2

| | HIGH CONDUCTIVE RUBBER LAYER BeS | |
|---|---|---|
| COMPOSITION | T = 0.2 mm | T = 2.0 mm |
| Natural rubber | 40 (parts by weight) | 40 (parts by weight) |
| Styrene-butadiene rubber *8 | 60 | 60 |
| Carbon black (N134) *9 | 85 | — |
| Carbon black (N330) *10 | — | 65 |
| Aromatic oil | 15 | 15 |
| Zinc oxide | 2 | 2 |
| Aging resistor *11 | 1 | 1 |
| Vulcanization accelerator (DPG) *12 | 0.2 | 0.2 |
| Vulcanization accelerator (NS) *13 | 0.8 | 0.8 |
| Sulfur | 1.5 | 1.5 |

TABLE 2-continued

| | HIGH CONDUCTIVE RUBBER LAYER BeS | |
|---|---|---|
| COMPOSITION | T = 0.2 mm | T = 2.0 mm |
| Volumetric resistivity (Ω.cm) at 25° C. | $1.7 \times 10^4$ | $1.8 \times 10^5$ |

*8 SBR1500 made by JSR Corp.
*9 $N_2SA$: 146 $m^2/g$, DPB: 127 cc/100 g
*10 $N_2SA$: 83 $m^2/g$, DPB: 102 cc/100 g
*11 N-(1,3-dimethylbutyl)-N'-phenyl-p-phenylene diamine
*12 diphenyl guanidine
*13 N-tert-butyl-2-benzothiazolyl sulfenamide In the unvulcanized tread rubber 18-1e, 18-2e shown in FIGS. 19 and 20, it is possible to form the tread cap rubber portion from the low conductive rubber Ae with the contents of silica and carbon black defined as above, and to form the sub-sidewall rubbers Ce and base rubber portion Be from a high conductive rubber defined as above.

The unvulcanized tread rubber obtained as above can be advantageously applied to produce improved pneumatic tires, some embodiments of which will be briefly explained with reference to FIGS. 21 to 24. The tire 40 includes a tread portion 41, a pair of sidewall portions 42 10 on both sides of the tread portion 41, and a pair of the bead portions 43. Theses portions 41, 42 and 43 are reinforced by a radial carcass 45 which extends toroidally between the bead cores 44 embedded in the bead portions 43. A belt 46 is arranged on the radially outer side of the carcass 45 to further reinforce the tread portion 41.

The radial carcass 45 includes one or more plies of rubber-coated cords, e.g. two plies in the illustrated embodiment. The carcass 45 of tires 40 for relatively small-sized vehicles such as passenger cars is typically of one-ply or two-ply structure. In any case the ply cord is preferably made of organic fiber cord, for example polyester cord or nylon cord. The carcass 45 of tires 40 for relatively large sized vehicles such as trucks and busses preferably has a one-ply structure, with the ply cord made of steel cord.

The belt 46 comprises not less than two layers of rubber-coated cords, e.g. three layers in the illustrated embodiment which is suitable for passenger car tires. In this instance, two layers adjacent to the carcass 45 are mutually crossed steel cord layers, and a helical layer of organic fiber cord, e.g. Nylon 66 cord, is wound around the steel cord-crossing layer. In the case of tires for trucks and busses, the belt 46 has not less than three steel cord crossed layers.

The rubbercoated cords for the carcass 45 and/or belt 47 comprise a conventional high conductive rubber containing carbon black. Also, the rubber at the bead portions 43 to be brought into contact with the rim comprises a high conductive unvulcanized rubber. Therefore, so long as the rim is made of a high conductive material such as metal, a discharge path for electrostatic charges can be established between the vehicle body and the belt layer.

Figure 21:
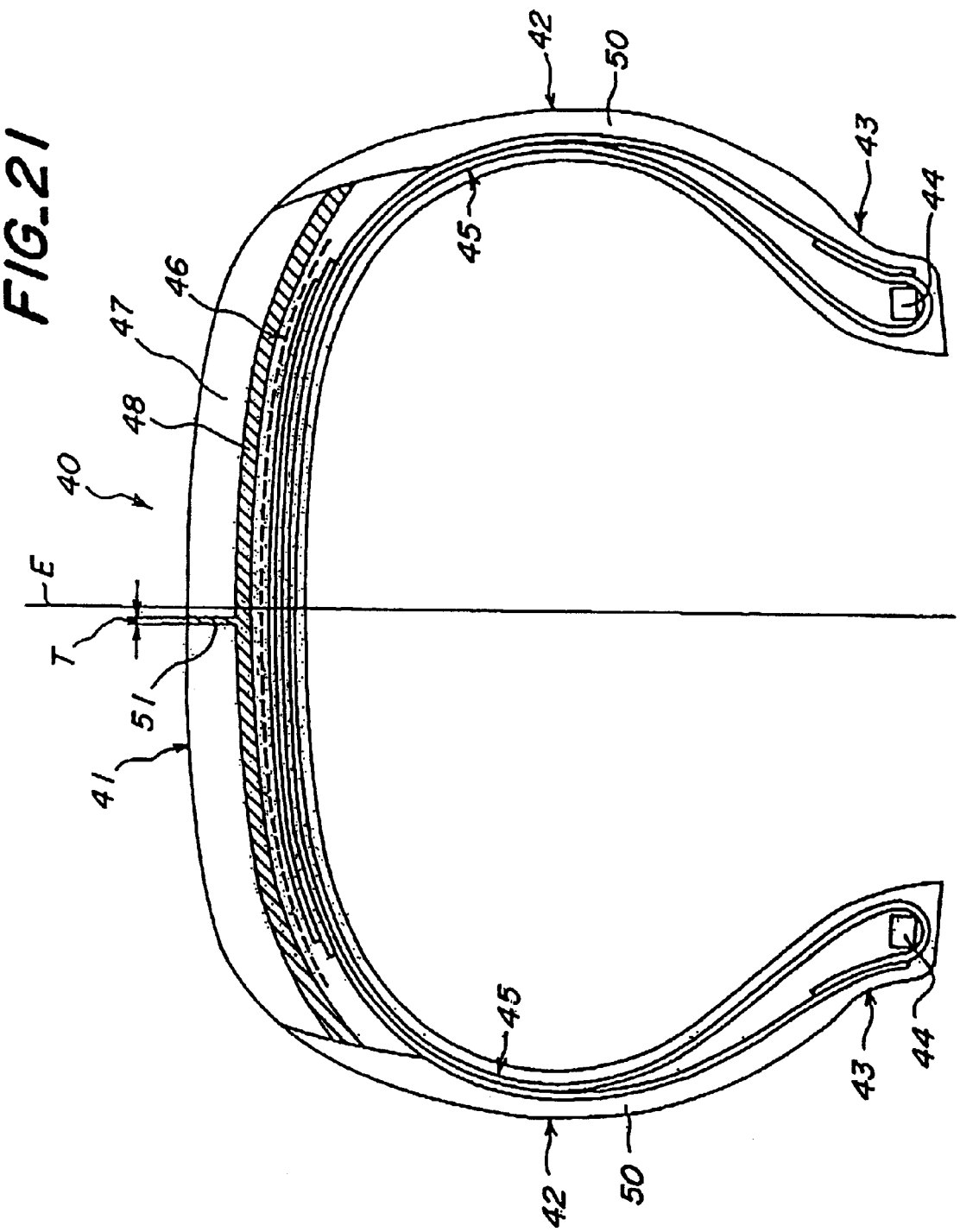
FIG. 21 is a sectional view of a pneumatic tire with a tread rubber corresponding to the unvulcanized tread rubber shown in FIG. 17.

The tread rubber at the tread portion 41 shown in FIG. 21 has a so-called cap-and-base structure, in which the cap rubber 47 is arranged on the tread surface side and the base rubber 48 is arranged on the radially inner side of the cap rubber 47. The cap rubber 47 is formed by vulcanization of the low conductive rubber Ae shown in FIG. 17. The base rubber 48 is formed by vulcanization of the high conductive rubber Be shown in FIG. 17. A high conductive rubber strip 51 of a very thin gauge T extends from the base rubber 48 up to the tread surface of the tread portion 41. The high conductive rubber strip 51 is formed by vulcanization of the high conductive rubber BeS shown in FIG. 17.

Figure 22:
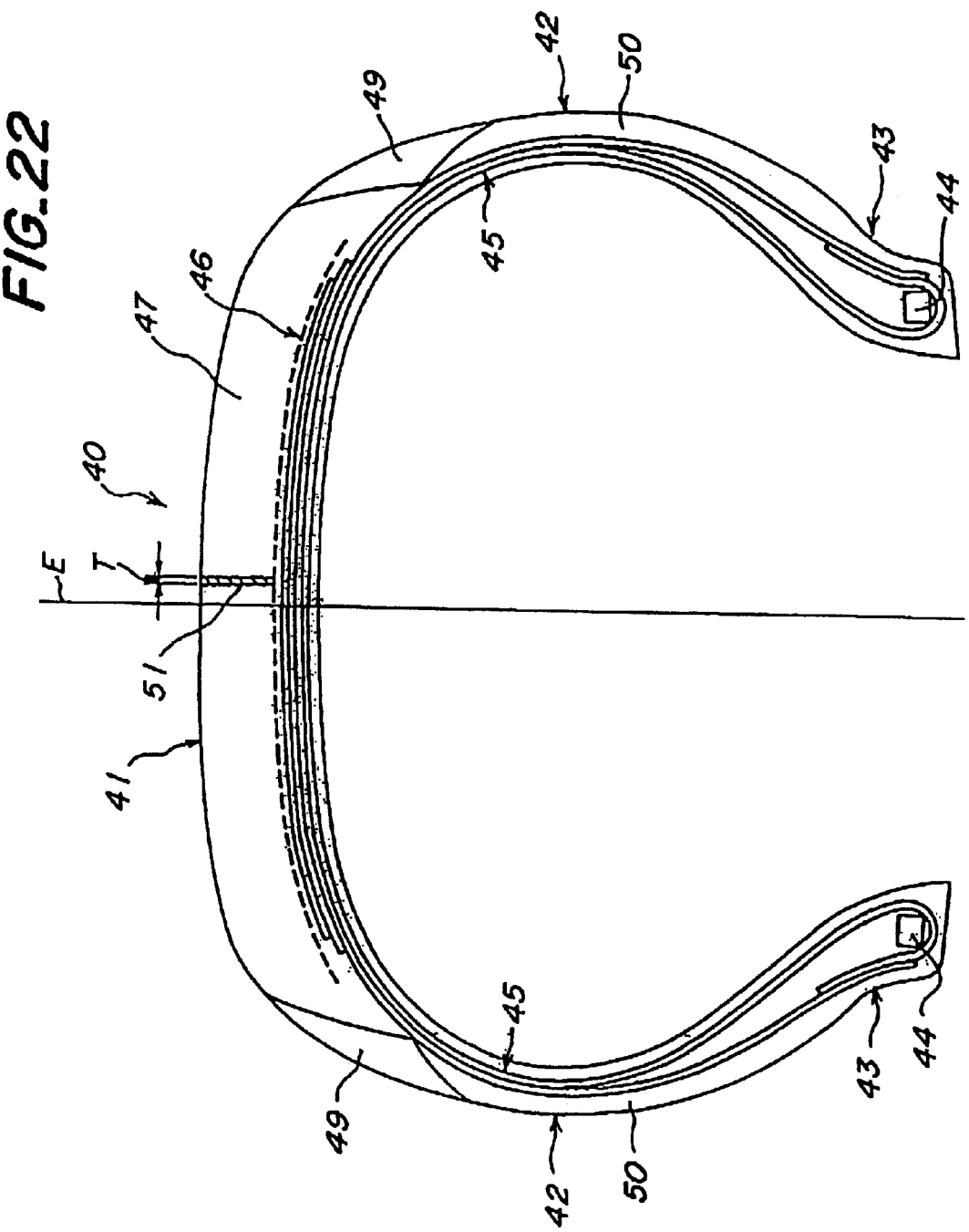
FIG. 22 is a sectional view of a pneumatic tire with a tread rubber corresponding to the unvulcanized tread rubber shown in FIG. 18.

The tread rubber at the tread portion 41 shown in FIG. 22 has a unitary tread rubber 47 extending from the tread side up to the belt layer 46, and a pair of the sub-sidewall rubbers 49 on both sides of the tread rubber 47. The tread rubber 47 is formed by vulcanization of the low conductive rubber Ae shown in FIG. 18. The sub-sidewall rubbers 49 are formed by vulcanization of the high conductive rubber Ce shown in FIG. 18, and connected to the sidewall rubbers 50. A high conductive rubber strip 51 very thin gauge T is in contact with the coating rubber of the belt layer 46, and extends substantially straightly up to the tread surface of the tread portion 41. The high conductive rubber strip 51 is formed by vulcanization of the high conductive rubber CeS shown in FIG. 18.

Figure 23:
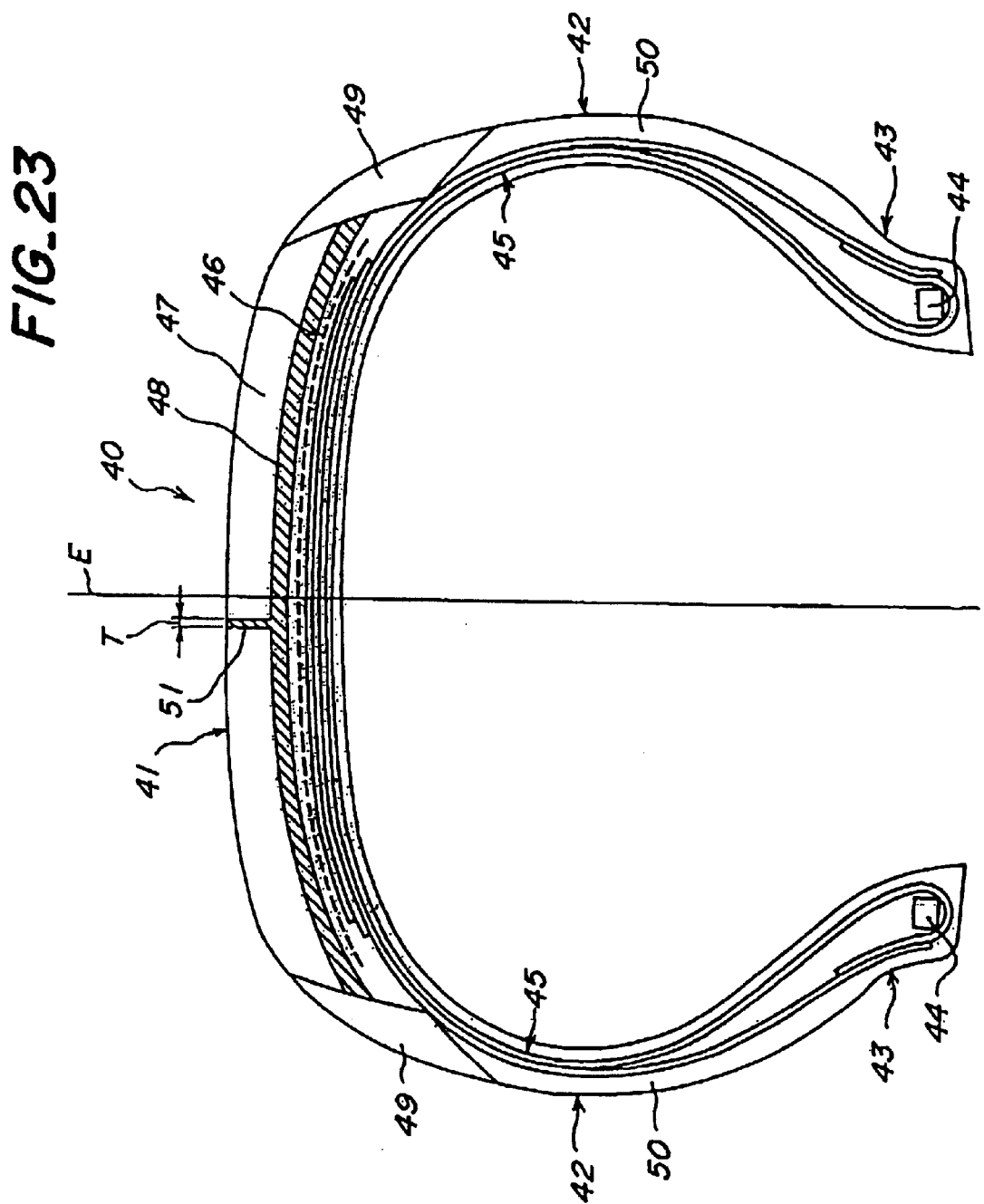
FIG. 23 is a sectional view of a pneumatic tire with a tread rubber corresponding to the unvulcanized tread rubber shown in FIG. 19.

The tread rubber at the tread portion 41 shown in FIG. 23 has a tread cap rubber 47, a base rubber 48 inside the cap rubber 47, and a pair of sub-sidewall rubbers 49 on both sides of the cap rubber 47 and the base rubber 48. The cap rubber 47 is formed by vulcanization of the low conductive rubber Ae shown in FIG. 19. The base rubber 48 is formed by vulcanization of the high conductive rubber Be shown in FIG. 19. The sub-sidewall rubbers 49 are formed by vulcanization of the low conductive rubber Ce shown in FIG. 19. A high conductive rubber strip 51 of a very thin gauge T extends substantially straightly from the base rubber 48 up to the tread surface of the tread portion 41. The high conductive rubber layer 51 is formed by vulcanization of the low conductive rubber BeS shown in FIG. 19.

The tread rubber at the tread portion 41 shown in FIG. 24 has a bead cap rubber 47, a base rubber 48 inside the cap rubber 47, and a pair of sub-sidewall rubbers 49 on both sides of the cap rubber 47 and the base rubber 48. The cap rubber 47 is formed by vulcanization of the low conductive rubber Ae shown in FIG. 20. The base rubber 48 is formed by vulcanization of the high conductive rubber Be shown in FIG. 20. The sub-sidewall rubbers 49 are formed by vulcanization of the low conductive rubber Ce shown in FIG. 20. Since the base rubber 48 is made of a low conductive rubber, a high conductive rubber strip 51 of a very thin gauge T is in contact with the belt 46 and extends substantially straightly up to the tread surface of the tread portion 41. The high conductive rubber strip 51 is formed by vulcanization of the high conductive rubber CeS shown in FIG. 20.

Since the thickness t of the high conductive unvulcanized rubber layer BeS, CeS is within a range of 0.05–3.5 mm, the thickness T of the high conductive rubber strip 51 in the widthwise direction of the tread is within a range of 0.05–3.5 mm.

Preferably, the low conductive rubber has a volumetric resistivity ρ of not less than $10^8$ Ω·cm at 25° C., and the high conductive rubber has a volumetric resistivity ρ of not more than $10^6$ Ω·cm at 25° C. Examples of the volumetric resistivity ρ in the above-mentioned tires are shown in the lowest columns the above Tables 1, 2, respectively.

In this connection, the volumetric resistivity ρ(Ω·cm) is determined by the following method. First of all, a sample vulcanizing condition is determined to be substantially the same as that for producing actual tires. Disk-like rubber samples having a radius r of 2.5 cm and a gauge g of 0.2 cm are then prepared by vulcanizing rubbers A, B, C under the condition determined as above. For these rubber samples, electrical resistance values R are measured by insulation resistance test device made by Advance Company. The volumetric resistivity P is obtained by the equation: ρ=R × (a/g), where a =π×$r^2$.

The electrical resistance value R is measured with the test rubber sample interposed between a disk-like main electrode which is identical in diameter with the sample, and a disk-like counter electrode which is smaller in diameter than the main electrode and surrounded by an annular guard electrode.

The present invention can be applied to tires comprising a tread portion 41 with a tread pattern in which one or more ribs are continuously arranged in the circumferential direction of the tread in the center region on both sides of the tire equatorial plane E. The center region corresponds to the above-mentioned center region Rc of unvulcanized tread rubber. In this instance, at least one of these ribs is provided with the high conductive rubber strip 51 of the very thin gauge T. The present invention can also be applied to tires comprising a tread portion 41 with a tread pattern in which one or more rows of blocks are arranged in the center region so as to extend in the circumferential direction of the tread. In the case of the block pattern, the high conductive unvulcanized rubber layer 51 is recessed at the lateral grooves for defining the blocks, though the surface of the blocks necessarily exists in the center region of the tread portion 41 in contact with the road surface, under a normal load condition of the tire. Therefore, in any tread pattern, the electrostatic charges of the vehicle body can be discharged to the road surface through the high conductive rubber strip 51.

In the embodiment of the tires shown in FIGS. 21 to 24, there may be provided two or more high conductive rubber strips 51 of the very thin gauge T. Since the gauge of the high conductive rubber strip 51 is very thin, even when the tread rubber gets is worn during the use of tire, the high conductive rubber strip 51 does not protrude radially outwards. It is thus possible to prevent non-uniform wear, and formation of cracks in the tread rubber adjacent to the high conductive rubber strip 51.

While the present invention has been described above with reference to specific embodiments, it is of course that they have been presented by way of examples only, and various modifications and/or alterations are possible without departing from the scope of the invention as defined by the appended claims.

What is claimed is:

1. A method for producing an unvulcanized tread rubber for pneumatic tires, wherein at least one kind of low conductive unvulcanized rubber and at least one kind of high conductive unvulcanized rubber are supplied to respective extruder units on upstream side of a common extrusion head, and thereby caused to flow along respective independent passages in the extrusion head and then merged with each other at a back side of an extrusion orifice in the extrusion head, before they are continuously extruded from the extrusion orifice as an integrated composite body of unvulcanized rubbers corresponding to the unvulcanized tread rubber, wherein:

the low conductive unvulcanized rubber is passed through a first passage extending from first extruder unit to the back side of the extrusion orifice, to form at least a cap rubber portion of a tread rubber in a product tire;

the high conductive unvulcanized rubber is passed through a second passage extending from a second extruder unit to the back side of the extrusion orifice, to form at least part of the remaining portion of the tread rubber;

the high conductive unvulcanized rubber while passing through the second passage is partly introduced into a narrow third passage branched from the second passage, and passed through a slit opening having a cross-sectional shape which is substantially straight in a height direction of the extrusion head and situated in a vicinity of the back side of the extrusion orifice, to form a narrow strip of the high conductive rubber in said composite body unvulcanized rubbers, said narrow strip extending in the low conductive rubber portion of the tread substantially over the entire thickness of the cap rubber portion and circumference thereof, and the high conductive unvulcanized rubber is caused to flow out of the third passage with a speed at the back side of the extrusion orifice which is lower than the speed of the low conductive unvulcanized rubber from the first passage.

2. The method according to claim 1, wherein said low conductive unvulcanized rubber contains silica which is not less than 40 parts by weight (PHR), and carbon black which is not more than 30 parts by weight (PHR).

3. The method according to claim 1, wherein said slit opening of the third passage has a width which is within a range from 0.8 to 4.5 mm.

4. The method according to claim 1, wherein said narrow strip of the high conductive rubber is formed in said composite body of unvulcanized rubbers to have a thickness which is within a range from 0.05 to 3.5 mm.

5. The method according to claim 1, wherein the third passage has a cross-sectional area which diminishes toward the slit opening.

6. The method according to claim 1, wherein the high conductive unvulcanized rubber is caused to flow out of the third passage at a location adjacent to the back side of the extrusion orifice, which corresponds to a widthwise center region of a base rubber portion of the tread rubber.

7. The method according to claim 1, wherein the remainder of the high conductive unvulcanized rubber is passed through the second passage to form a base rubber portion of the tread rubber.

8. The method according to claim 1, wherein the remainder of the high conductive unvulcanized rubber is passed through the second passage to form a pair of auxiliary sidewall portions on both sides of the tread rubber.

9. An apparatus for producing an unvulcanized tread rubber for pneumatic tires, wherein at least one kind of low conductive unvulcanized rubber and at least one kind of high conductive unvulcanized rubber are supplied to respective extruder units on upstream side of a common extrusion head, and thereby caused to flow along respective independent passages in the extrusion head and then merged with each other at a back side of extrusion orifice in the extrusion head, before they are continuously extruded from the extrusion orifice as an integrated composite body of unvulcanized rubbers corresponding to the unvulcanized tread rubber, said apparatus comprising:

a first passage extending from a first extrusion unit to the back side of the extrusion orifice, for allowing the low conductive unvulcanized rubber to be passed therethrough to form at least a cap rubber portion of a tread rubber in a product tire;

a second passage extending from a second extrusion unit to the back side of the extrusion orifice, for allowing the high conductive unvulcanized rubber to be passed therethrough to form at least part of the remaining portion of the tread rubber; and a narrow third passage branched from the second passage so that the high conductive unvulcanized rubber while passing through the second passage is partly admitted into the third passage and passed through a slit opening having a cross-section which is substantially straight in a height direction of the extrusion head and situated in a vicinity of a back side of the extrusion orifice to form a narrow strip of the high conductive rubber in said composite body of unvulcanized rubbers, said narrow strip extending in the low conductive rubber portion of the tread substantially over the entire thickness of the cap rubber portion and circumference thereof; and the third passage is so arranged that the high conductive unvulcanized rubber is caused to flow out the third passage, with a speed at the back side of the extrusion orifice which is lower than the speed of the low conductive unvulcanized rubber from the first passage.

10. The apparatus according to claim 9, wherein the third passage is arranged so that said narrow strip of the high conductive rubber formed in said composite body of unvulcanized rubbers has a thickness which is within a range from 0.05 to 3.5 mm.

11. The apparatus according to claim 9, wherein the third passage has a cross-sectional area which diminishes toward the slit opening.

12. The apparatus according to claim 9, wherein said slit opening of the third passage has a width is within a range from 0.8 to 4.5 mm.

13. The apparatus according to claim 9, wherein slit opening of the third passage is situated at a location adjacent to the back side of the extrusion orifice, which corresponds to a widthwise center region of the base rubber portion of the tread rubber.

14. The apparatus according to claim 9, wherein said first, second and third passages are provided in an insert block which forms a detachable part of the extrusion head.

15. The apparatus according to claim 14, wherein said third passage is provided in a sub-insert block which forms a detachable part of the insert block.

* * * * *